US009831750B2

(12) United States Patent
Brown et al.

(10) Patent No.: US 9,831,750 B2
(45) Date of Patent: Nov. 28, 2017

(54) STATOR COIL LACING MACHINE

(71) Applicant: Link Engineering Company, Plymouth, MI (US)

(72) Inventors: Warren Charles Brown, Northville, MI (US); Timothy G Olex, Livonia, MI (US); Richard Logan Baird, Metamora, MI (US)

( * ) Notice: Subject to any disclaimer, the term of this patent is extended or adjusted under 35 U.S.C. 154(b) by 252 days.

(21) Appl. No.: 14/676,333

(22) Filed: Apr. 1, 2015

(65) Prior Publication Data
US 2015/0288260 A1 Oct. 8, 2015

Related U.S. Application Data

(60) Provisional application No. 61/974,659, filed on Apr. 3, 2014.

(51) Int. Cl.
*H02K 15/02* (2006.01)
*H02K 15/00* (2006.01)

(52) U.S. Cl.
CPC .... *H02K 15/0043* (2013.01); *Y10T 29/53143* (2015.01)

(58) Field of Classification Search
CPC ...... H02K 15/00; H02K 15/02; H02K 15/026; H02K 15/0043; H01R 43/033; Y10T 29/53143
See application file for complete search history.

(56) References Cited

U.S. PATENT DOCUMENTS

| | | | |
|---|---|---|---|
| 2,580,871 | A | 1/1952 | Wirtz |
| 2,883,949 | A | 4/1959 | Ammann |
| 3,050,019 | A | 8/1962 | Muskulus |
| 3,440,979 | A | 4/1969 | Frederick |
| 3,659,337 | A | 5/1972 | Gawthrop et al. |
| 3,685,470 | A | 8/1972 | Frederick |
| 3,813,754 | A | 6/1974 | Fields et al. |
| 3,824,940 | A | 7/1974 | Habegger et al. |
| 3,862,493 | A | 1/1975 | Habegger et al. |
| 3,983,826 | A | 10/1976 | Dunn |
| 4,266,492 | A | 5/1981 | Bienz |
| 4,563,962 | A | 1/1986 | Muskulus |
| 4,614,161 | A * | 9/1986 | Frederick ........... H02K 15/0043 112/470.23 |

(Continued)

FOREIGN PATENT DOCUMENTS

WO 2005022724 A1 * 3/2005

*Primary Examiner* — Carl Arbes

(57) ABSTRACT

A stator coil lacing machine includes a carriage pivotably connected to a frame. The carriage supports a needle assembly and cord guide assembly. The needle assembly includes a needle, a needle rotation actuator that rotates the needle about its longitudinal axis, and a needle translation actuator that moves the needle along its longitudinal axis. The cord guide assembly includes a cord guide shaft, a cord guide wag actuator that rotates the cord guide shaft about its longitudinal axis, and a cord guide lift actuator that rotates the cord guide shaft about an axis transverse to its longitudinal axis. A carriage actuator pivots the carriage relative to the frame. The carriage actuator, the needle rotation actuator, the needle translation actuator, the cord guide wag actuator, and the cord guide lift actuator cooperate in a manner that results in lacing of the stator coil.

12 Claims, 18 Drawing Sheets

(56) References Cited

U.S. PATENT DOCUMENTS

| | | | |
|---|---|---|---|
| 5,485,670 A * | 1/1996 | Bouman | H02K 15/0043 242/432.4 |
| 5,511,502 A * | 4/1996 | Moser | H02K 15/0043 112/2 |
| 5,615,472 A | 4/1997 | Bouman et al. | |
| 6,519,832 B1 | 2/2003 | DeHart | |
| 6,637,593 B2 | 10/2003 | Weissbrod | |
| 6,944,932 B2 | 9/2005 | Fortuna | |
| 7,036,762 B2 | 5/2006 | Fortuna | |

* cited by examiner

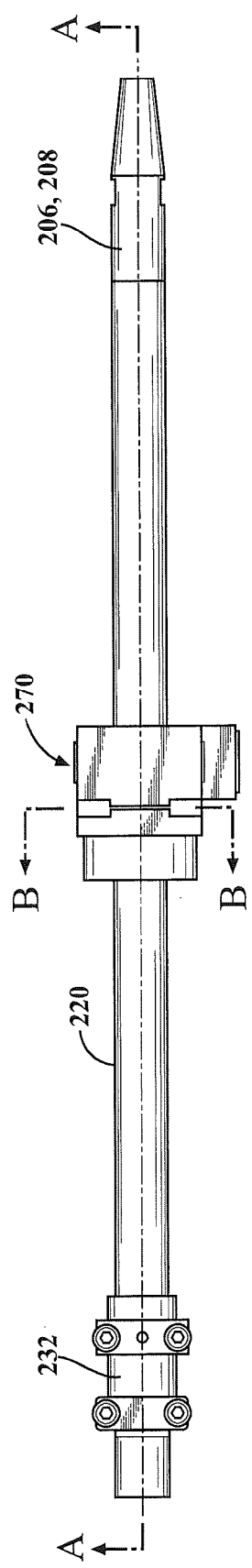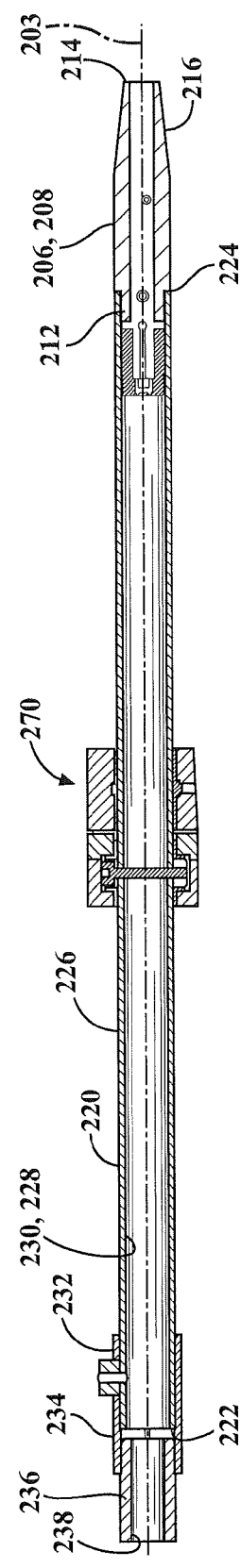

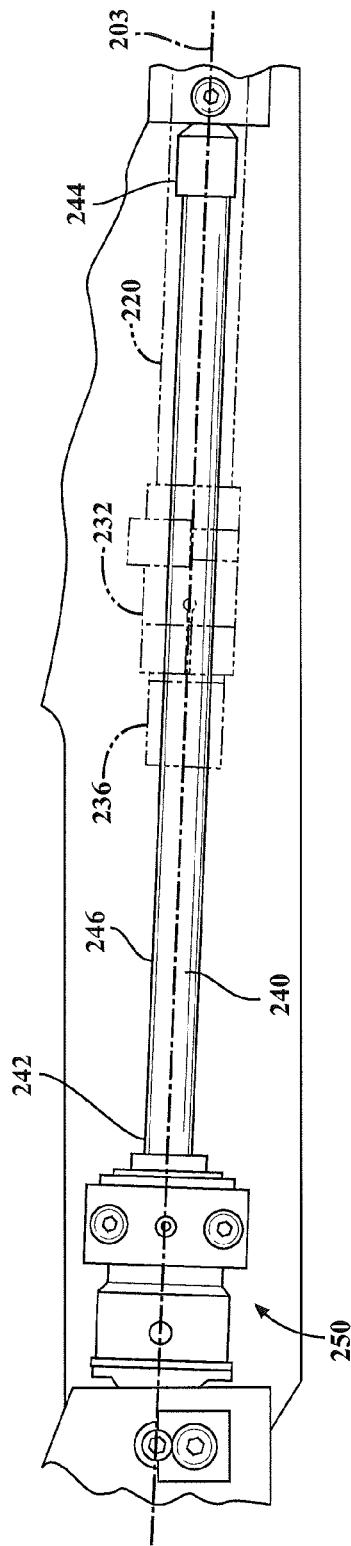
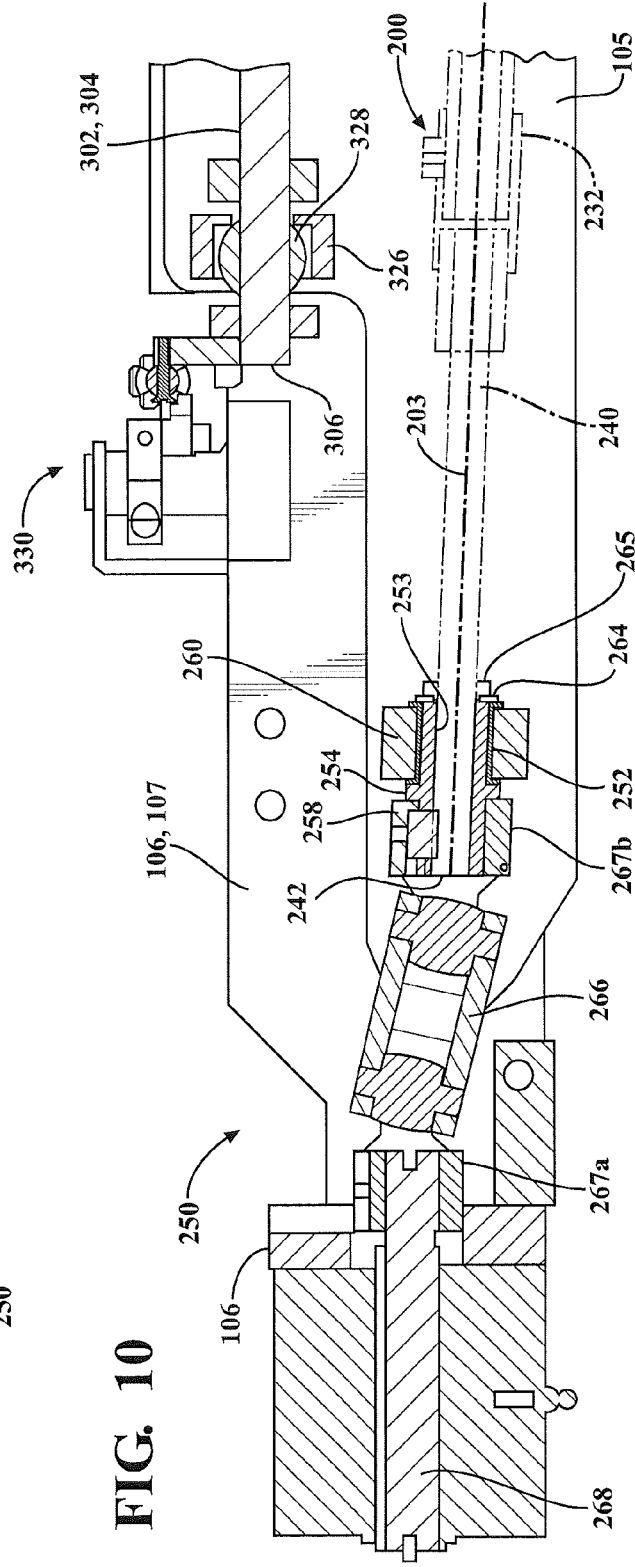
FIG. 9
FIG. 10

FIG. 11
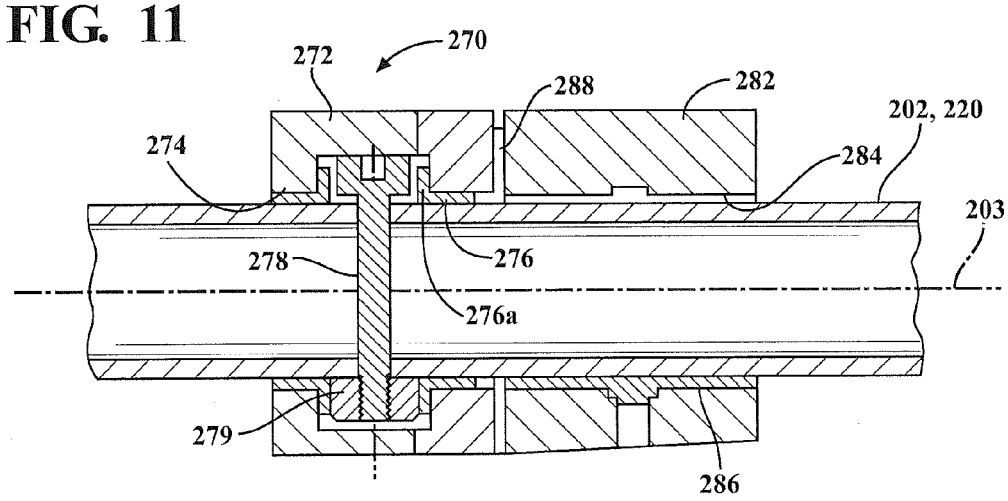
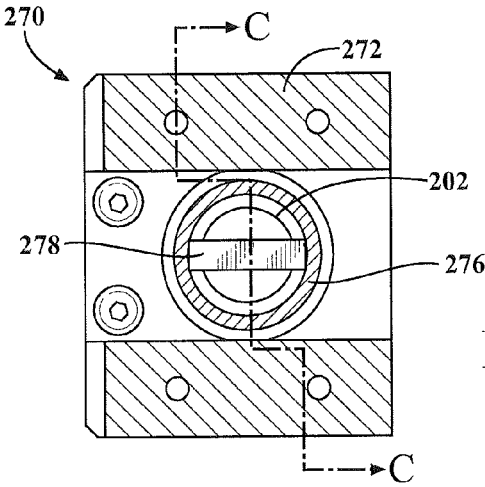
FIG. 12
FIG. 13
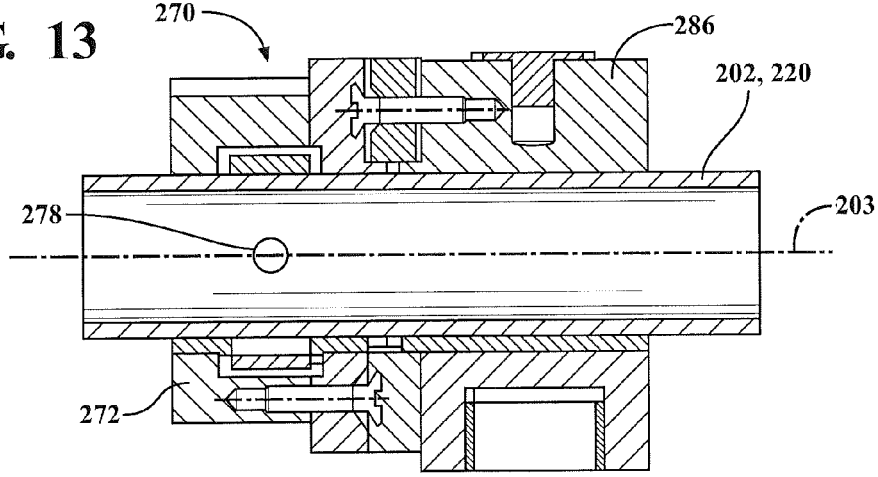

FIG. 22
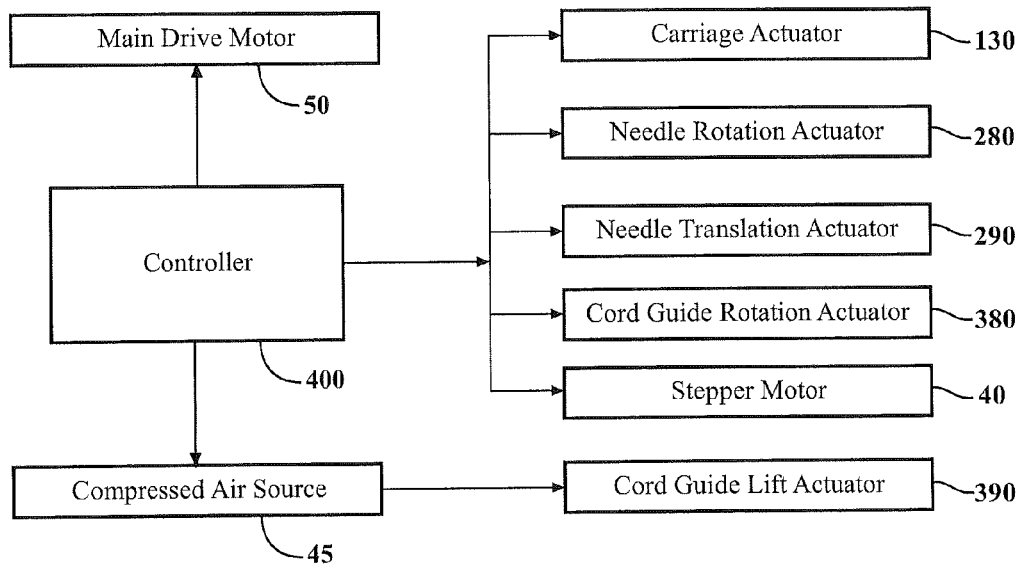
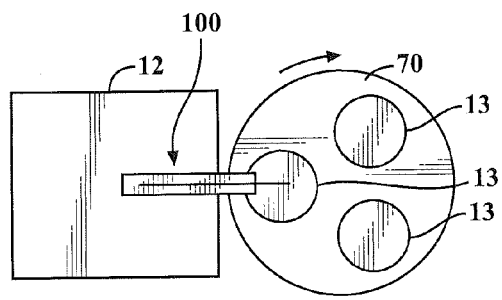
FIG. 23
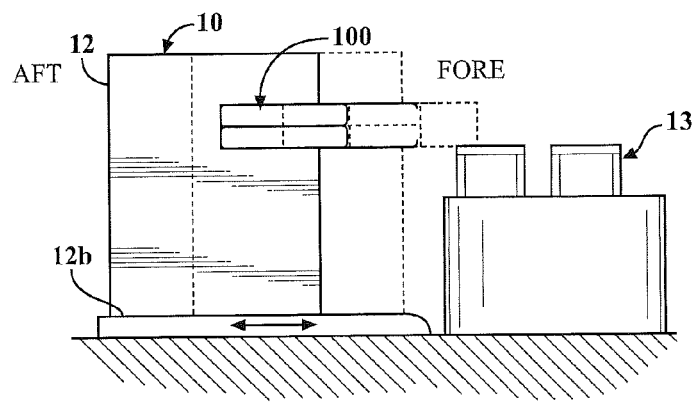
FIG. 24

STATOR COIL LACING MACHINE

CROSS-REFERENCE TO RELATED APPLICATIONS

This application claims the benefit of U.S. Provisional Application No. 61/974,659, filed Apr. 3, 2014 and entitled "Stator Coil Lacing Machine," the contents of which are incorporated by reference herein.

BACKGROUND OF THE INVENTION

This invention relates to an apparatus for lacing the end windings of a stator of an electrodynamic machine.

Numerous types of electrodynamic machines such as induction and synchronous type alternating current electric motors, generators, etc., include a stator having a metallic core with multiple coiled wire windings running therethrough which develop magnetic fields necessary for operation of the device. Typically, these windings are bundled together at the axial ends of the stator. It has been found that the durabilty of the electrodynamic machine can be enhanced if these end windings are tightly bound together. It is further desirable to bind the end windings to prevent their interfering with other components of the device, and to properly place the windings in contact with thermally sensitive elements typically used for machine overheating protection. Automated machinery for lacing the end windings of stators are known.

SUMMARY

In some aspects, a stator coil lacing machine is configured to lace a stator coil, and includes a frame, and a carriage supported on the frame. The carriage includes a housing pivotably supported on the carriage via a first pin, and a needle assembly supported on the housing, and a cord guide assembly supported on the housing. The needle assembly includes a needle shaft, a needle rotation actuator configured to rotate the needle shaft about a longitudinal axis of the needle shaft, and a needle translation actuator configured to move the needle shaft along the longitudinal axis of the needle shaft. The cord guide assembly includes a cord guide shaft. The stator coil lacing machine further comprises a cord guide wag actuator connected to the cord guide shaft, the cord guide wag actuator configured to rotate the cord guide shaft about a longitudinal axis of the cord guide shaft, a cord guide lift actuator connected to the cord guide shaft, the cord guide lift actuator configured to rotate the cord guide shaft about an axis transverse to the longitudinal axis of the cord guide shaft, and a carriage actuator connected to the housing. The carriage actuator is configured to move the housing relative to the carriage, and the carriage actuator, the needle rotation actuator, the needle translation actuator, the cord guide wag actuator, and the cord guide lift actuator are configured to be cooperatively actuated in a manner that results in lacing of the stator coil.

The stator coil lacing machine includes one or more of the following features: The carriage is an upper carriage, and the stator coil lacing machine further comprises a lower carriage that is substantially identical to the upper carriage and is connected to the frame in an orientation that mirrors the orientation of the upper carriage. The lower carriage includes a lower carriage housing pivotably supported on the lower carriage via a second pin, and the carriage actuator is configured to rotate the upper carriage housing about the first pin and rotate the lower carriage housing about the second pin such that the upper carriage housing moves relative to the lower carriage housing in a scissoring motion. The machine further includes a stator coil mount configured to support a stator coil in the vicinity of the needle assembly. The stator coil mount includes a rotatable platform that is configured to support at least two stator coils. The frame is configured to translate between a first position that is a first distance from the stator coil mount and a second position that is a second distance from the stator coil mount, where the first distance is different than the second distance. The needle shaft includes a hollow mid portion including a first end, a second end opposed to the first end, and a longitudinal axis that extends between the first end and the second end. The needle shaft includes a hooked tip connected to the mid portion second end, and a splined shaft that is rotatable relative to the housing. The splined shaft engages an inner surface of the mid portion in a manner that permits a rotation of the splined shaft to be transferred to the mid portion, and that permits the mid portion to telescope relative to the splined shaft. The needle rotation actuator is connected to the mid portion first end via the splined shaft. The needle assembly further includes a thrust block fixed to the mid portion, the thrust block including a needle shaft bore that receives the mid portion therethrough, and a second pin that secures the mid portion to the thrust block. The needle assembly includes a drive block that includes a clearance bore that receives the mid portion therethrough, the drive block connected to an actuator that is configured to drive the mid portion along the longitudinal axis of the mid portion, and a safety release device disposed between the thrust block and the drive block. The safety release device is configured to secure the drive block to the thrust block during normal operation of the needle assembly, and to release the drive block from the thrust block upon an abnormal operation of the needle assembly including impact of the tip with the stator coil. The safety release device is a magnet. A lubrication-free polymer bearing is disposed in the clearance bore between the drive block and the needle shaft. A flange bearing is disposed in the needle shaft bore between the thrust block and the needle shaft in a manner so that thrust applied to the thrust block is transferred to the second pin via a flange portion of the flange bearing.

In some aspects, a needle assembly for use in a stator coil lacing machine includes a needle shaft that terminates in a needle tip, and a thrust block fixed to the needle shaft. The thrust block includes a needle shaft bore that receives the needle shaft therethrough, and a pin that secures the needle shaft to the thrust block. The needle assembly also includes a drive block that includes a clearance bore that receives the needle shaft therethrough, the drive block connected to an actuator that is configured to drive the needle shaft along a longitudinal axis of the needle shaft, and a safety release device disposed between the thrust block and the drive block. The safety release device is configured to secure the drive block to the thrust block during normal operation of the needle assembly, and to release the drive block from the thrust block upon an abnormal operation of the needle assembly including impact of the needle assembly with a stator coil being laced in the stator coil lacing machine.

The needle assembly may include one or more of the following features: The safety release device is a magnet. A lubrication-free polymer bearing is disposed in the clearance bore between the drive block and the needle shaft. A flange bearing is disposed in the needle shaft bore between the thrust block and the needle shaft in a manner so that thrust applied to the thrust block is transferred to the pin via a flange portion of the flange bearing.

In some aspects, a stator coil lacing machine includes a frame and a carriage. The carriage includes a fixed housing connected to the frame; a moveable housing rotatably connected to the fixed housing via a first pin; a needle assembly supported on the moveable housing in a manner such that the needle assembly is moveable relative to the moveable housing; a lift housing rotatably connected to the moveable housing by a second pin; and a cord guide assembly having a first end supported on the moveable housing and a second end supported on the lift housing. The machine also includes a first actuator connected to the moveable housing, the first actuator configured to rotate the moveable housing about the first pin; and a second actuator connected to the lift housing, the second actuator configured to rotate the lift housing about the second pin.

The stator coil lacing machine may include one or more of the following features: The needle assembly includes a needle; a needle rotation actuator configured to rotate the needle relative to the moveable housing about a longitudinal axis of the needle; and a needle translation actuator configured to move the needle relative to the moveable housing along the longitudinal axis of the needle. The needle is connected to the needle translation actuator via a safety release device, wherein the safety release device is configured to secure the needle translation actuator to the needle during normal operation of the needle assembly, and to release the needle translation actuator from the needle upon an abnormal operation of the needle assembly including impact of the needle with an external object. The cord guide assembly includes a cord guide shaft; and a cord guide wag actuator connected to the cord guide shaft. The cord guide wag actuator is configured to rotate the cord guide shaft about a longitudinal axis of the cord guide shaft.

The stator coil lacing machine includes a carriage that supports a cord guide and a needle assembly. The carriage is an elongated member that is pivotably connected at one end to a support frame. Advantageously, the carriage is lightweight relative to the carriages of some conventional stator coil lacing machines. For example, by selecting lighter weight fabrication materials and incorporating them in components designed to have reduced weight, the mass of the carriage is reduced. For example, in some embodiments the carriage is about 9 pounds, as compared to conventional carriages used in stator coil lacing machines that may weigh about 22 pounds, a reduction of about 60 percent. In addition, by pivoting the carriage relative to the frame, only about half the mass of the carriage must be lifted to achieve the desired needle motion. As a result, the carriage can be moved faster relative to the carriages of some conventional stator coil lacing machines, in which the carriage is lifted up and down on a pair of parallel vertical shafts. Since the carriage can be moved faster, the stator coil lacing machine can lace faster than some conventional stator coil lacing machines. For example, the stator coil lacing machine including the pivoting, light weight carriage can provide about 150 stitches per minute as compared to some conventional stator coil lacing machines, which typically provide a maximum of about 125-130 stitches per minute. In addition to, or alternatively to, permitting faster lacing, these features permit smaller motor(s) to be used in the stator coil lacing machine.

The cord guide and needle assembly cooperate to lace the end windings of the stator coil. The needle assembly includes a hooked needle. During a lacing operation, the needle is advanced under the coil ends and along a land of the stator between the grooves in which the coils are wound to extend therebeyond within the stator. The lacing cord is fed to the cord guide, which has its end adjacent to the internal wall of the stator. The cord guide is moveable upwardly above the needle and downwardly below the needle and oscillated to lay the thread into the facing hook of the needle before the needle is retracted. Upon retraction, the needle is rotated about its longitudinal axis to permit the loop thereon to slide therefrom as the cord is drawn therethrough. The needle is then lifted above the top of the coil ends, advanced again to a position within the stator, and rotated about its longitudinal axis to present the needle hook in an open position. The cord guide is lifted above the needle, and the cord is laid in the needle hook upon the reverse oscillation of the cord guide, after which the needle is retracted while rotated to have the side opposite the hook presented upwardly so that it can pull the hooked thread through the loop formed therebefore which passes from the needle end. The needle and cord guide then drop to the lower position, and the cord guide is oscillated to face the needle hook which has been rotated theretoward. Upon the reverse movement, the cord will be laid in the needle hook and the cycle will be repeated as the stator is indexed by steps having dwell intervals therebetween.

In the stator coil lacing machine, since the cord guide and the needle are both supported on the carriage, they are moved together relative to the stator via the motion of the carriage. Although movement of the carriage provides nearly all the required motion of the cord guide, during the lacing operation, when the needle is above the coil ends, the cord guide is positioned above the needle, and when the needle is positioned below the coil ends, the cord guide is positioned below the needle. To achieve the required additional relative motion of the cord guide, the carriage includes a cord guide lift assembly that is configured to properly position the cord guide relative to the needle. Placement of the cord guide and the cord guide lift assembly on the same carriage as the needle results in a stator lacing machine that is much simplified relative to some stator lacing machines in which the cord guide is moved via a separate, dedicated mechanism and actuator. Moreover, the cord guide lift assembly, which provides the cord guide with an additional five-eighths inch of travel relative to the needle, is much smaller and lighter than some conventional separate, dedicated cord guide lift assemblies that must provide a much greater travel distance, for example in a range of 1 to 2.5 inches.

Further advantageously, the stator coil lacing machine includes a needle safety release device that causes the needle actuator to be detached from the needle in the event of an impact of the needle with a fixed object such as the stator coil, whereby the needle and actuation mechanism are protected from damage. The needle safety release device includes a magnet that releasably secures the needle shaft to the needle actuator. By using a magnet to releasably secure the needle shaft to the needle actuator, the release device is simplified, relatively low in cost, reliable, light in weight and more easily re-secured relative to some previous needle safety release devices.

In the stator coil lacing machine, conventional oil-lubricated bearing assemblies have been replaced by lubrication-free bearings with polymer bearing surfaces. In addition to lubrication-free bearings, in some embodiments, the stator coil lacing machine incorporates servo and/or stepper motors to drive actuators and index the stator rather than the conventional motor-driven cam-and-linkage actuator assemblies that are found in some conventional lacing machines and which also require constant generous oil lubrication via an oil sump and lubrication distribution system. By employing lubrication-free bearings and stepper/servo motors rather than lubricated bearing assemblies and conventional motor-driven cam-and-linkage actuator assemblies, the oil sump and lubrication distribution system required to lubricate both the bearing assemblies and the cam-and-linkage actuator assemblies can be omitted, whereby cost and complexity of the stator coil lacing machine is reduced, operation of the stator coil lacing machine becomes much cleaner, and maintenance of the stator coil lacing machine is simplified.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 7 is a top view of the mid-portion and tip of the needle shaft.

FIG. 8 is a cross sectional view of the mid-portion and tip of the needle shaft as seen along line A-A of FIG. 7.

FIG. 9 is a side view of the splined portion of the needle shaft.

FIG. 10 is a cross-sectional view of the first connection assembly as seen along line A-A of FIG. 4.

FIG. 11 is an enlargement of a portion of FIG. 8 showing a cross sectional view of the second connection assembly.

FIG. 12 is a cross sectional view of the second connection assembly as seen along line B-B of FIG. 7.

FIG. 13 is a cross sectional view of the second connection assembly as seen along line C-C of FIG. 12.

FIG. 22 is a schematic diagram illustrating the control system of the stator coil lacing machine.

FIG. 23 is a top schematic view of an alternative stator coil lacing machine in which multiple stator support devices are supported on a rotatable platform.

FIG. 24 is a side schematic view of another alternative stator coil lacing machine in which the frame is moveable along a rail relative to the stator support device between a first position (shown in solid lines) and a second position (shown in broken lines).

DETAILED DESCRIPTION

Figure 1A:
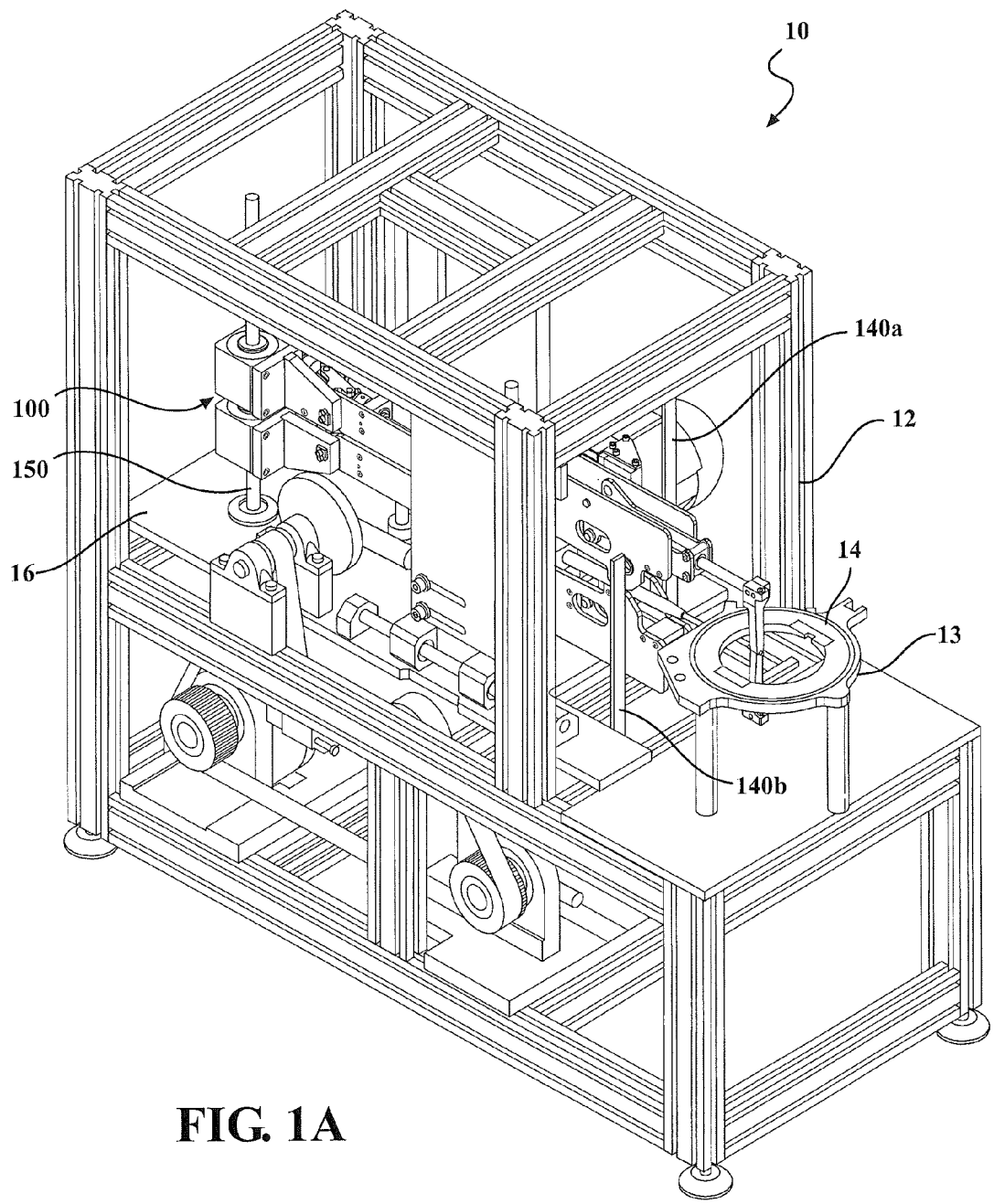
FIG. 1A is a front, right-side perspective view of the stator coil lacing machine.

Referring to FIGS. 1A-1D, a stator coil lacing machine 10 includes an extruded aluminum or welded steel frame 12, and a main platform 16 secured to the frame 12, and a pair of carriages 100 supported on the frame 12 above the main platform 16 via a pair of vertically extending rods 20. The stator coil lacing machine 10 also includes a stator support device 13 supported on the frame 12 adjacent to the carriage assemblies 100. The stator support device 13 includes a stationary platform 14 including a central opening 15. The stationary platform 14 supports a stator (not shown) within the central opening 15 so that its axis is vertically oriented, an upper end of the stator resides above the platform 14, and a lower end the stator resides below the platform 14. The stator support device 13 ensures registration of the stator with the frame 12, and thus also in registration with the pair of carriages 100. A first one of the carriages 100 (e.g., the upper carriage 100a) is arranged above the platform 14 so as to reside adjacent to an upper end of the stator when the stator is supported by the support device 13 so that it can lace the upper end windings of the stator coil. Similarly, a second one of the carriages 100 (e.g., the lower carriage 100b) is arranged below the platform 14 so as to reside adjacent to a lower end of the stator so that it can lace the lower end windings of the stator coil.

Figure 2:
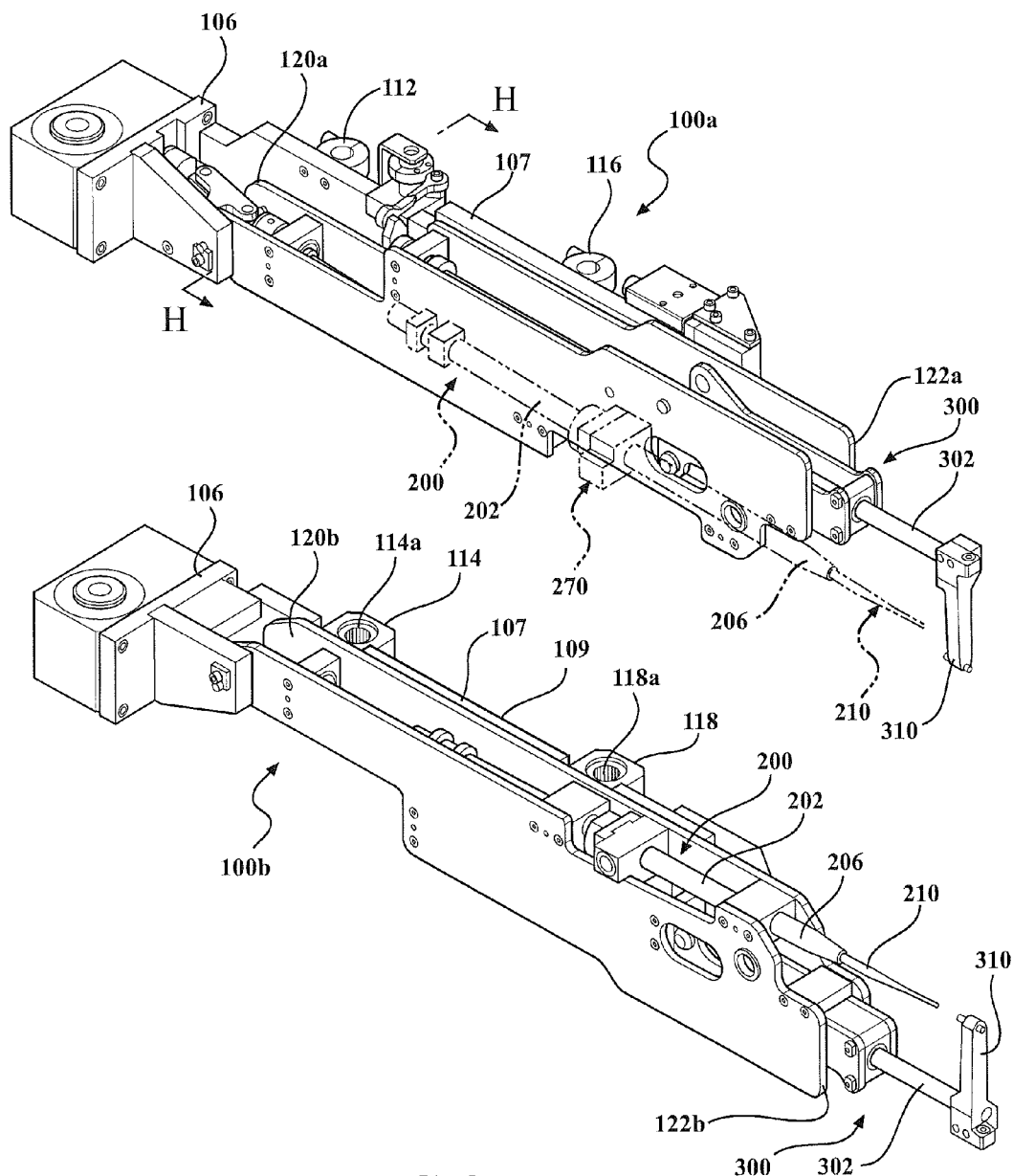
FIG. 2 is a front, right side perspective view of the upper carriage and lower carriage isolated from the stator coil lacing machine.
Figure 3:
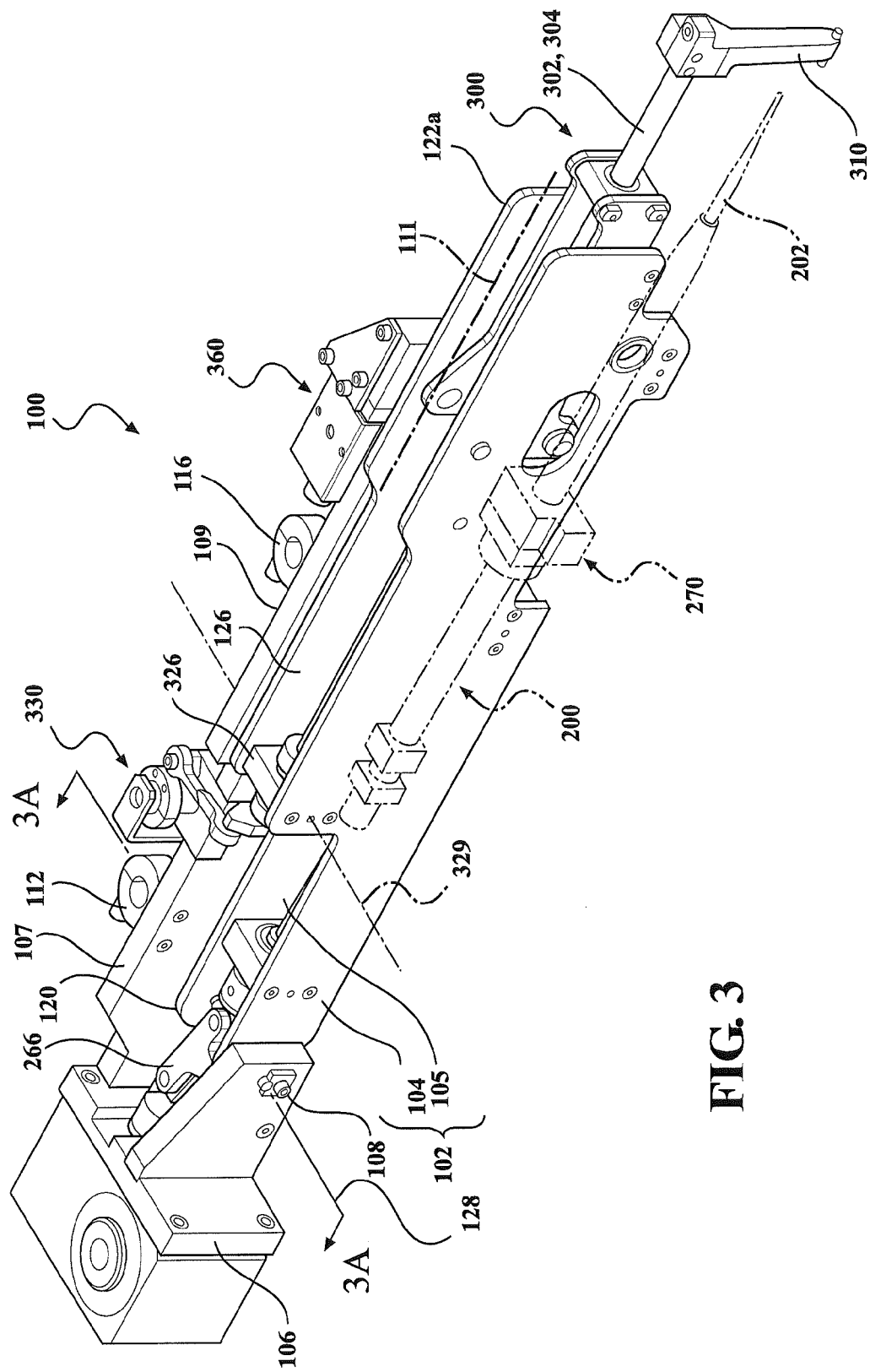
FIG. 3 is an enlarged, front, right-side perspective view of the upper carriage.
Figure 3A:
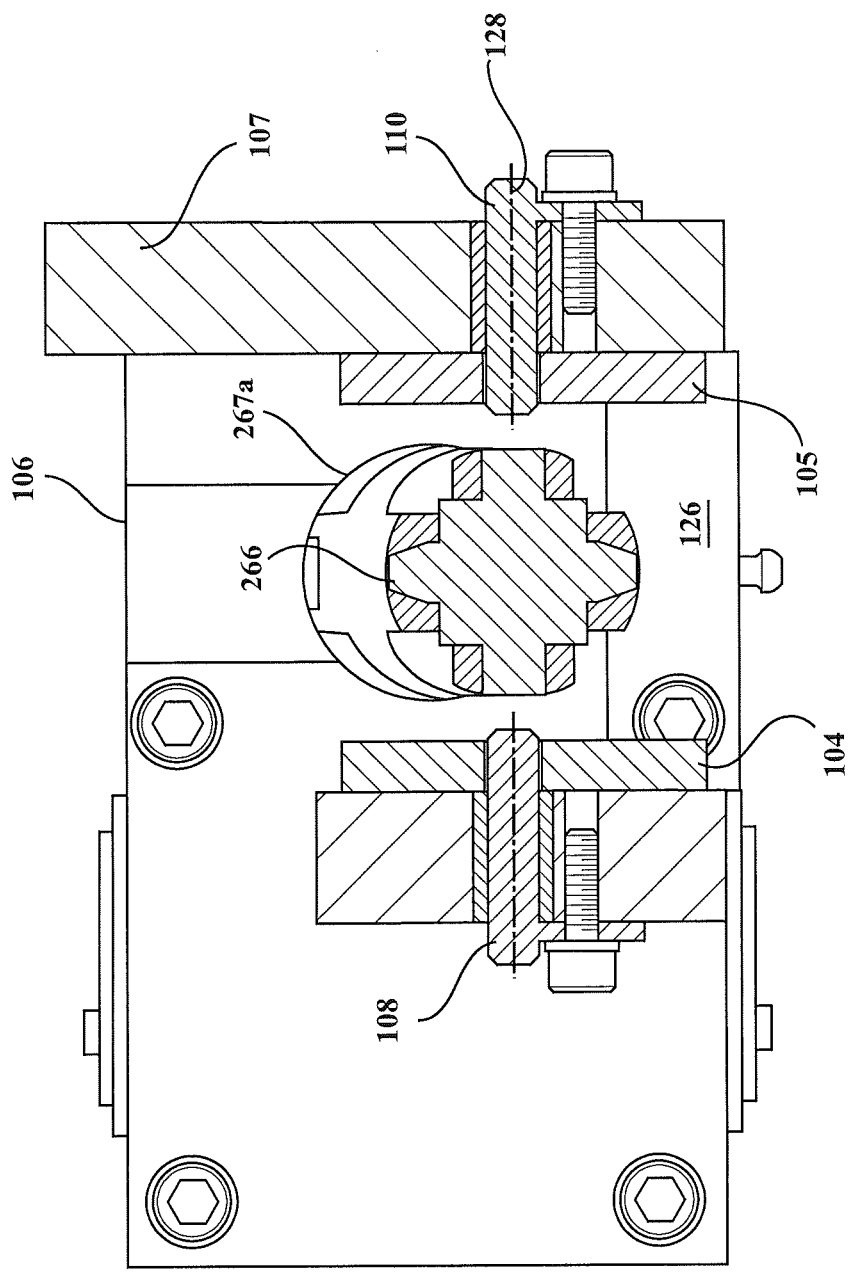
FIG. 3A is cross-sectional view of the upper carriage as seen along line 3A-3A of FIG. 3.

Referring also to FIG. 2, the lower carriage 100b is mounted on the frame 12 in an inverted orientation relative to the upper carriage 100a so that, in use, the motion of the carriages 100a, 100b mirror each other. Each of the carriages 100 is configured to pivot relative to the frame 12, and includes a needle assembly 200 including a needle shaft 202, and a cord guide assembly 300 including a cord guide 302 supported thereon in a manner that permits motion of the needle shaft 202 and the cord guide assembly 300 relative to the respective carriage 100 and to each other to achieve lacing of the end turns of the wire coil of a stator, as discussed further below.

Referring to FIGS. 2, 3, 3A and 4, the upper carriage 100a and lower carriage 100b are substantially identical, and thus only the upper carriage 100a (referred to hereafter as carriage 100) will be described in detail. The carriage 100 includes a stationary housing 106 that includes an elongated plate 107. The carriage 100 also includes a pair of pillow blocks 114, 118, secured to an outer surface 109 of the plate 107. Each pillow block 114, 118 defines a bore 114a, 118a lined with lubrication-free polymer bearing surface. The plate 107 is mounted on the vertical rods 20, each of which passes through the respective bore 114a, 118a of one of the pillow blocks 114, 118. The vertical position of the stationary housing 106 relative to the rods 20 is fixed using a pair of manually-operated clamps 112, 116. The clamps 112, 116 permit adjustment of the vertical position of the stationary housing 106. As a result, the vertical position of the carriage 100 can be adjusted to correspond to the core stack height of the stator 2 to be laced. The elongation-direction of the plate 107 defines a stationary housing longitudinal axis 111 that is oriented generally horizontally.

Figure 1B:
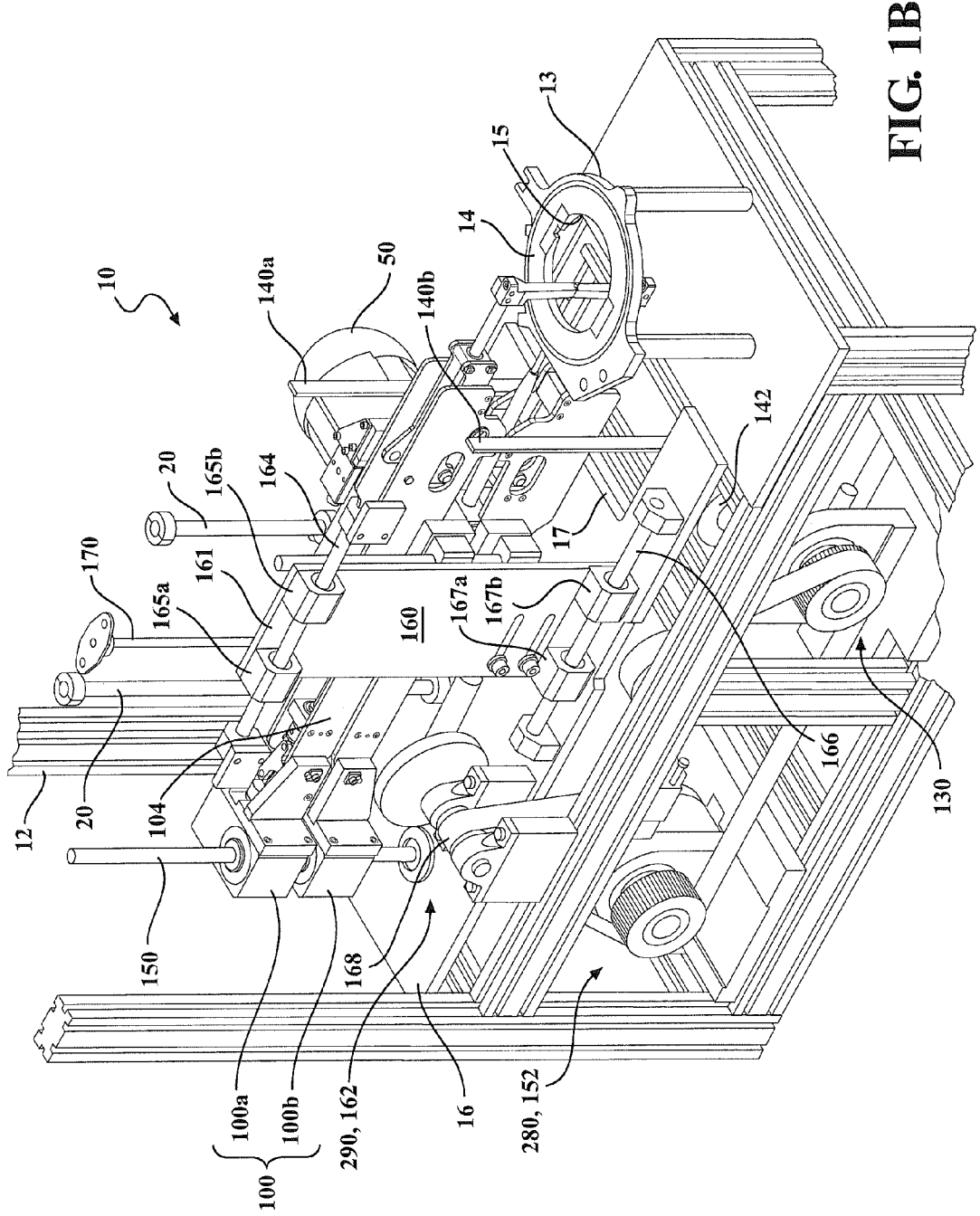
FIG. 1B is an enlarged, front, right-side perspective view of the stator coil lacing machine of FIG. 1A, with portions of the frame omitted.
Figure 1C:
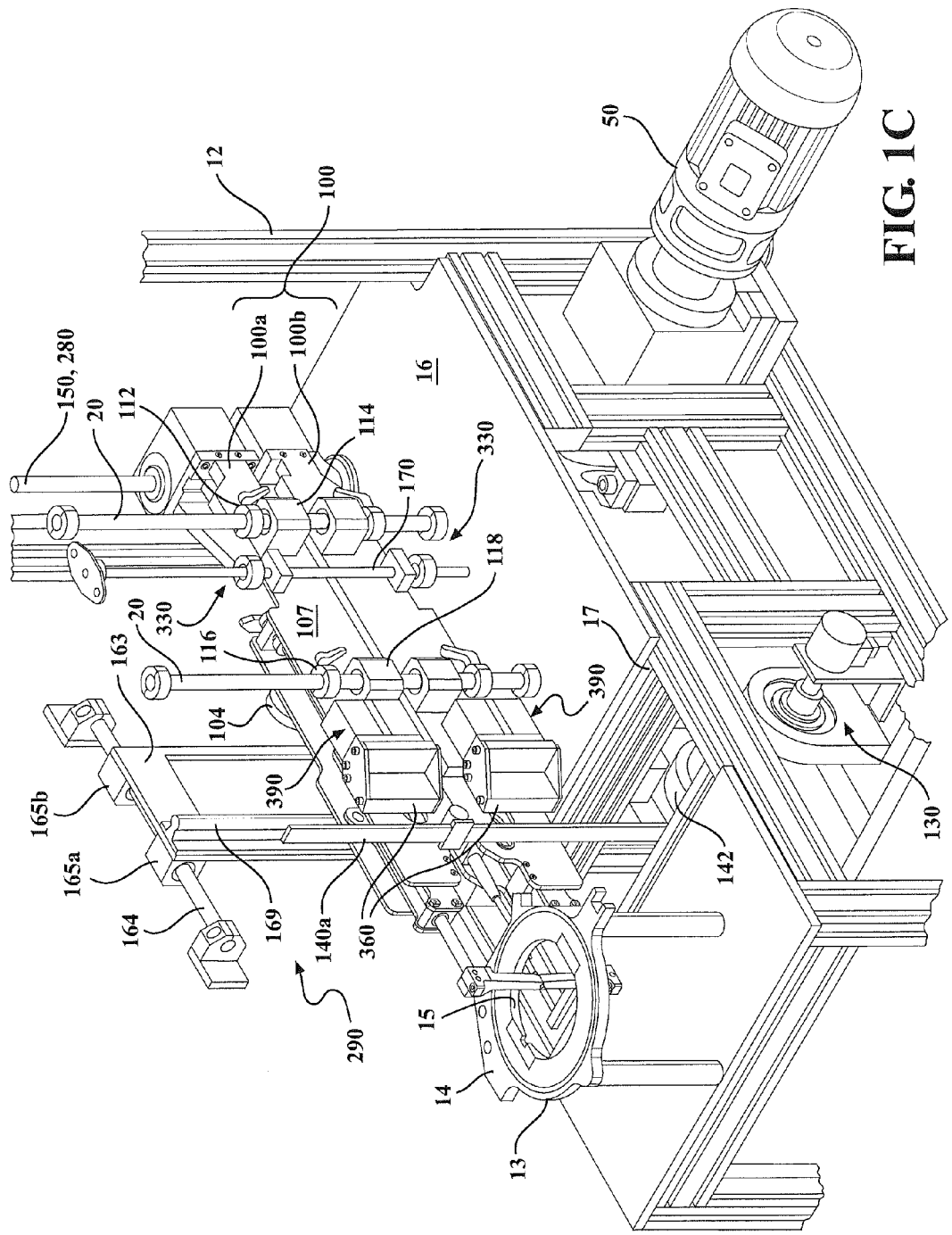
FIG. 1C is an enlarged, front, left-side perspective view of the stator coil lacing machine of FIG. 1A, with portions of the frame omitted.
Figure 1D:
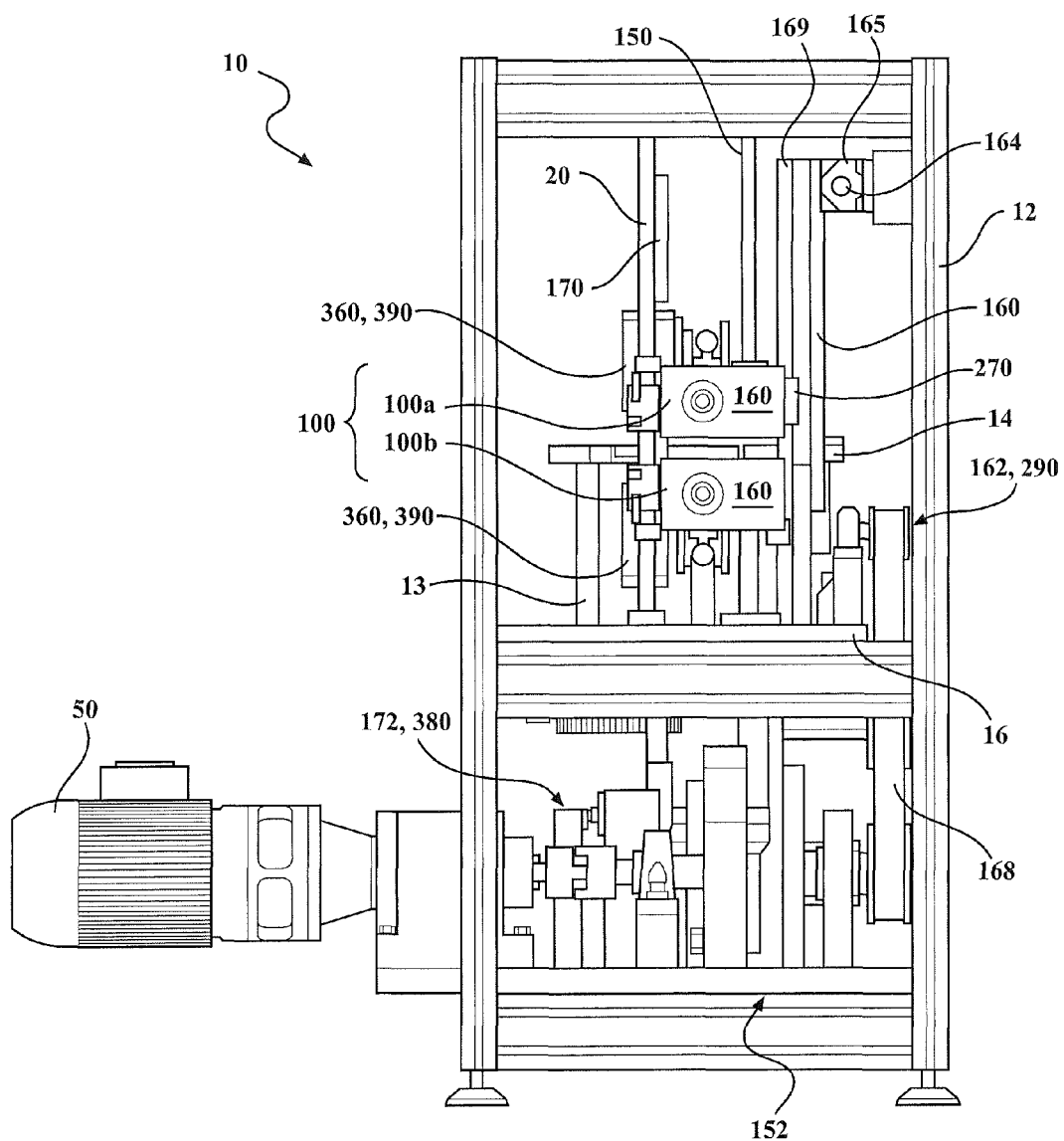
FIG. 1D is a rear view of the stator coil lacing machine of FIG. 1A.

Each carriage 100 also includes a moveable housing 102 pivotably secured to the stationary housing 106. The moveable housing 102 includes a pair of elongated, parallel side plates 104, 105. Each side plate 104, 105 has a first end 120 that corresponds to a first end of the moveable housing 102, and an opposed second end 122 that corresponds to a second end of the moveable housing 102. A longitudinal axis 124 of the moveable housing 102 extends between the first end 120 and the second end 122. The side plates 104, 105 are spaced apart in a direction transverse to the longitudinal axis 124, defining an interior space 126 that receives the needle assembly 200 and the cord guide assembly 300, as discussed further below. The first end 120 of one of the side plates 104 is pivotably secured to the stationary housing 106 via a first pin 108, and the first end 120 of the other of the side plates 105 is pivotably secured to the stationary housing 106 via a second pin 110. The first pin 108 and second pin 110 are coaxial, and together define a pivot axis 128 of the moveable housing 102. The position of the second end 122 of the moveable housing 102 relative to the stationary housing 106, and thus also relative to the frame 12, is determined by a carriage actuator 130 (FIGS. 1B, 1C and 22). The carriage actuator 130 is configured to move the moveable housing 102 relative to the stationary housing 106, whereby the carriage 100 is pivoted relative to the frame 12.

Referring again to FIGS. 1B and 1C, the carriage actuator 130 is disposed below the main platform 16, is connected to the second end 122 of the carriage 100 and is operable to lift the second end 122 relative to the first end 120 (e.g. pivot the carriage 100 about the pivot axis 128). In particular, a first elongated lift bar 140a extends vertically through an opening 17 in the main platform 16 and connects the second end 122 of the upper carriage 100a to the carriage actuator 130, and a second elongated lift bar 140b extends vertically through the opening 17 in the main platform 16 and connects the second end 122 of the lower carriage 100b to the carriage actuator 130. The lower ends of the first and second lift bars 140a, 140b are connected via cam followers (not shown) to profiles (not shown) formed in opposed surfaces of a cam plate 142 that is driven to rotate via belts connected to a drive motor 50. The respective profiles are 180 degrees out of phase, whereby a half rotation of the cam plate 142 causes one of the lift bars (e.g., 140a) to move vertically upwards while the other of the lift bars (e.g., lift bar 140b) to move vertically downwards, and the other half rotation of the cam plate 142 reverses these motions.

During operation, the carriage actuator 130 drives the upper carriage moveable housing second end 122a and the lower carriage moveable housing second end 122b to pivot about their respective pivot axes 128 in opposed directions in a scissoring motion.

Figure 5:
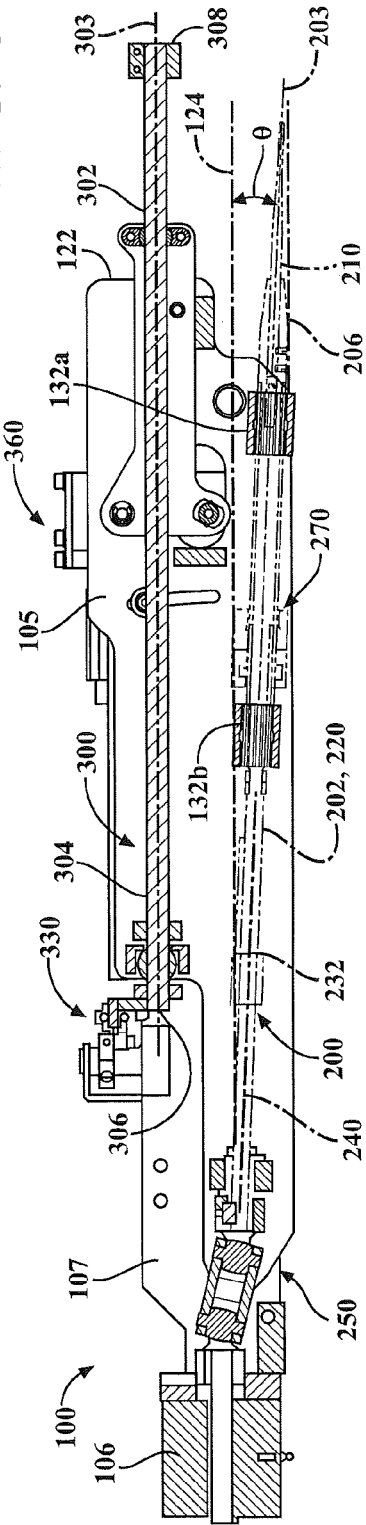
FIG. 5 is cross-sectional view of the upper carriage as seen along line A-A of FIG. 4.

Referring also to FIG. 5, the needle assembly 200 includes the needle shaft 202, a first connection assembly 250 that connects the needle shaft 202 to a needle rotation actuator 280 (FIGS. 1B, 1C and 22) that is configured to rotate the needle shaft 202 about its longitudinal axis 203, and a second connection assembly 270 that connects the needle shaft 202 to a needle translation actuator 290 (FIGS. 1B, 1C and 22) that is configured to move the needle shaft 202 along its longitudinal axis 203.

The needle shaft 202 is an assembly of the following three elements: a tip 206, a splined portion 240, and a hollow mid portion 220 disposed between the tip 206 and the splined portion 240. The tip 206, the mid portion 220 and the splined portion 240 are coaxial with the needle longitudinal axis 203. These three elements 206, 220, 240 will now be discussed in detail.

Figure 6:
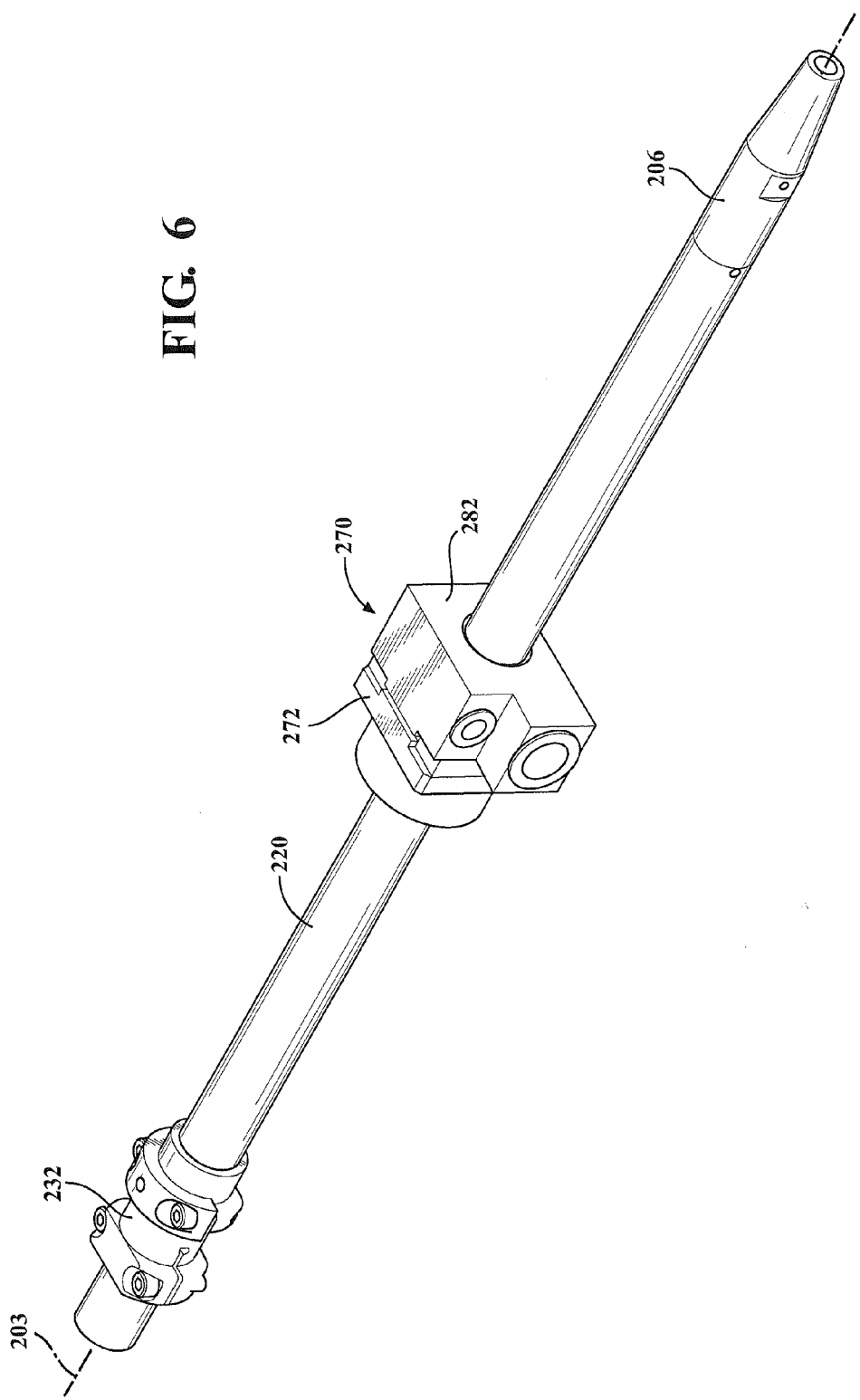
FIG. 6 is a perspective view of the mid-portion and tip of the needle shaft.

Referring to FIGS. 6-8, the mid portion 220 is an elongated, hollow tube having a first end 222, a second end 224 opposed to the first end 222, a through bore 230 that opens at both the mid portion first end 222 and the mid portion second end 224 and defines an inner surface 228, and an outer surface 226. The mid portion 220 includes a spline collar 232 disposed on the first end 222. The spline collar 232 includes a sleeve portion 234 that surrounds the mid portion first end 222 and is secured thereto in a conventional manner such as via a set screw and/or adhesive. The spline collar 232 also includes a cuff portion 236 that protrudes axially outwardly from the sleeve portion 234, and includes an inner surface 238 having surface features (for example, tabs, rails, or splines) that are shaped and dimensioned to engage splines formed on an outer surface 246 of the splined portion 240.

Referring to FIGS. 5 and 9-10, the splined portion 240 is an elongated, solid rod having a first end 242, a second end 244 opposed to the first end 242, and a longitudinally splined outer surface 246. The splined portion first end 242 is connected to the needle rotation actuator 280 via the first connection assembly 250. The splined portion 240 is received within the cuff portion 236 of the spline collar 232, and the spline portion outer surface 246 cooperates with the surfaces features formed on the cuff portion inner surface 238 to permit a telescoping axial translation of the splined portion 240 relative to the mid portion 220. In addition, the cooperative engagement between the spline portion outer surface 238 and the cuff portion 236 permits a rotation of the splined shaft to be transferred to the mid portion 220 via the spline collar sleeve portion 234. In particular, the splined portion 240 engages the mid portion 220 via the spline collar 232, and the splined portion second end 244 is received within the through bore 230, and is configured to translate relative to the mid portion 220 along the longitudinal axis 203.

Referring to FIGS. 2 and 7-8, the tip 206 includes a hooked needle 210 and a base 208 that secures the hooked needle 210 to the mid portion 220 and also registers the hooked needle 210 in a proper angular orientation relative to the mid portion 220. The hooked needle 210 is similar to a crochet hook in shape and function. The base 208 is a hollow tube having an outer dimension that is the same as that of the mid portion 220. In addition, the base 208 is thick-walled relative to the mid portion 220. A first end 212 of the base 208 has a reduced outer diameter that is dimensioned to be fitted within the mid portion second end 224. The base 208 includes a tapered portion 216 that is at a minimum dimension at the opposed second end 214 of the base 208. The hooked needle 210 protrudes from the base second end 214 (FIG. 2), and is fixed thereto via set screws.

In the illustrated embodiment, the mid portion 220 is made hollow and formed of aluminum, and the tip 206 is formed of steel and secured to the mid portion second end 224 in order to reduce the mass of the needle shaft 202.

Figure 4:
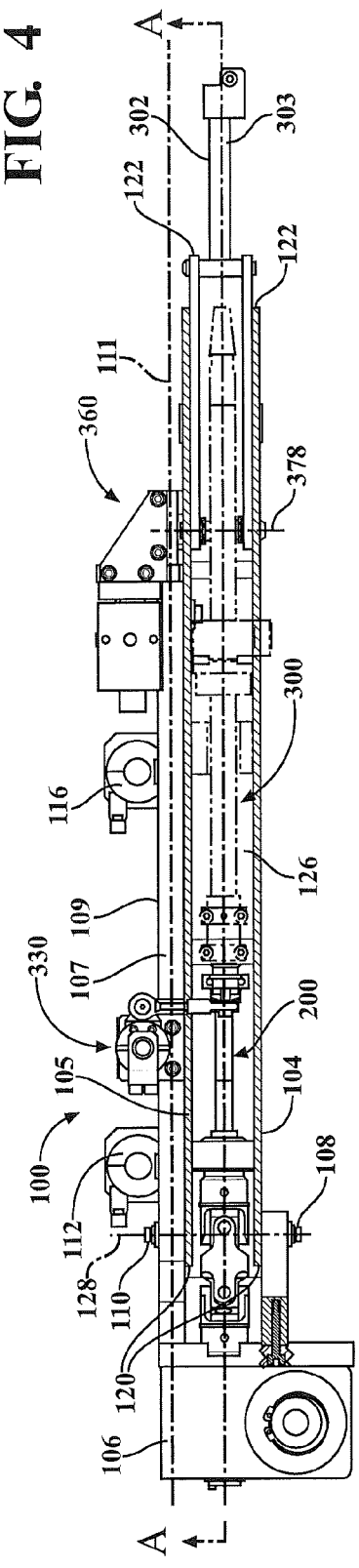
FIG. 4 is a top view of the upper carriage.

Referring to FIGS. 4-5, the needle assembly 200 is supported within the moveable housing interior space 126 via front and rear bearing housings 132a, 132b having lubrication-free polymer bearing surfaces. The needle assembly 200 is supported in a manner that permits both translation of the needle shaft 202 along the needle longitudinal axis 203, and rotation of the needle shaft 202 about the needle longitudinal axis 203. In addition, since the front bearing housing 132a is vertically offset relative to the rear bearing housing 132b, the needle assembly 200 is supported within the moveable housing interior space 126 in a manner that the needle longitudinal axis 203 is angled relative to the moveable housing longitudinal axis 124. For example, the needle longitudinal axis 203 is arranged at an angle θ of about 1.5 degrees to 2 degrees relative to the moveable housing longitudinal axis 124. As a result, in the upper carriage 100a, the splined portion first end 242 resides above the tip 206, and in the lower carriage 100b, the splined portion first end 242 resides below the tip 206.

Referring to FIG. 10, the needle assembly 200 includes the first connection assembly 250 that connects the needle shaft 202 to the needle rotation actuator 280 (FIGS. 1B, 1C and 22), whereby the needle shaft 202 can be rotated about its longitudinal axis 203. The first connection assembly 250 includes a double universal joint 266 that permits rotational connection of the spline portion 240 to an eccentrically positioned drive shaft 268 of the needle rotation actuator 280. The universal joint 266 includes connecting collars 267a, 267b at each opposed end thereof. The first connection assembly 250 also includes a cylindrical shaft adaptor 252 having a central, circumferentially-extending, outwardly-protruding flange 254 and an axial bore 253 that receives the needle splined portion first end 242 therein. One of the universal joint connecting collars 267b surrounds the shaft adaptor 252 on a first side of the flange 254, and a drive key 258 secures the connecting collar 267b to the splined portion first end 242 via an opening in the shaft adaptor 252. A bearing housing 260 is secured between the flange 254 and a thrust washer 264 via a retaining clip 265 such as an e-clip, and lubrication-free polymer flange bearings are disposed between the bearing housing 260 and a radially outward facing surface of the shaft adaptor 252. A rotational motion is transferred from the needle rotation actuator drive shaft 268 to the shaft adaptor 252 via the universal joint 266, and from the shaft adaptor 252 to the needle splined portion first end 242 via the drive key 258.

Referring again to FIGS. 1B and 1C, the needle rotation actuator 280 is connected to the spline portion 240 of the needle shaft 202 via the first connection assembly 250. The needle rotation actuator 280 includes a first cam-and-linkage subassembly 152 disposed below the main platform 16 that connects the main motor 50 to a vertically-oriented shaft 150. The first cam-and-linkage subassembly 152 is configured to produce an oscillatory motion of the shaft 150 (e.g., a "wagging" motion) over an angular range of ±90 degrees to 100 degrees. The shaft 150 extends through the main platform and passes through the stationary housing 106 of the lower carriage 100b and the upper carriage 100a. A right-angle gear system (not shown) disposed in each housing 106 is driven by the shaft 150, whereby an output shaft of the gear system (e.g., the drive shaft 268) has an increased angular range of about +180 degrees to 200 degrees. The oscillating motion of the output shaft 268 is transmitted to the needle assembly 200 via the double universal joint 266 of the first connection assembly 250 as discussed above.

Referring to FIGS. 6-7 and 11-13, the needle assembly 200 also includes the second connection assembly 270 that connects the needle shaft 202 to the needle translation actuator 290 (FIGS. 1B, 1C and 22), whereby the needle shaft 202 can be translated along its longitudinal axis 203. The second connection assembly 270 includes a thrust block 272 fixed to the needle shaft mid portion 220 at a location that is spaced apart from both the mid portion first end 222 and the mid portion second end 224. The second connection assembly 270 also includes a drive block 282 that is connected to the needle translation actuator 290, and a magnet 288 that secures the thrust block 272 to the drive block 282.

The thrust block 272 includes a needle shaft bore 274 that receives the mid portion 220 of the needle shaft 202 therethrough, and a connecting pin 278 and ring 279 that together secure the needle shaft mid portion 220 to the thrust block 272. A flange bearing 276 is disposed in the needle shaft bore 274 between the thrust block 272 and the needle shaft mid portion 220 in a manner so that thrust applied to the thrust block 272 is transferred to the connecting pin 278 and ring 279 via a flange portion 276a of the flange bearing 276. The thrust block 272 is formed of a magnetic-receptive material whereby the magnet 288 can form a magnetic connection with the thrust block 272.

The drive block 282 includes a clearance bore 284 that receives the needle shaft mid portion 220 therethrough. The clearance bore 284 is lined with a lubrication-free liner 286 that serves as a needle shaft bearing surface. The drive block 282 is fixed to the needle translation actuator 290 in a manner that permits the actuator 290 to drive the needle shaft 202 along the needle longitudinal axis 203, as discussed below. In addition, the drive block 282 is fixed (for example, via screws) to the magnet 288, which forms a magnetic connection with the thrust block 272.

The magnet 288 is disposed between the thrust block 272 and the drive block 282, and serves as a safety release device in the event of an impact of the needle 210 with a fixed object such as the stator coil, whereby the needle shaft 202 including the needle 210 and actuation mechanisms 270, 290 are protected from damage. The magnet 288 is selected so as to provide a magnetic force that is sufficiently high to secure the drive block 282 to the thrust block 272 during normal operation of the needle assembly, and sufficiently low to release the drive block 282 from the thrust block 272 upon an abnormal operation of the needle assembly 200, including impact of the needle 210 with the stator 2.

Referring again to FIGS. 1B-1D and 6, the needle translation actuator 290 is connected to the needle shaft mid portion 220 via the drive block 282 of the second connection assembly 270. The needle translation actuator 290 includes a second cam-and-linkage subassembly 162 disposed on the main platform 16, a stroke plate 160, a top rail 164, and a bottom rail 166. The second cam-and-linkage subassembly 162 is driven by the main motor 50 via a belt 168, and is connected to the stroke plate 160. The stroke plate 160 is a thin, rectangular plate having a first surface 161 that faces, and is oriented in parallel with, the carriage side plate 104, and a second surface 163 opposed to the first surface 161. In addition, the length (e.g., the greatest) dimension of the stroke plate 160 is oriented vertically such that an upper end of the stroke plate 160 resides above the upper carriage 100a, and the lower end of the stroke plate 160 resides below the lower carriage 100b.

The stroke plate 160 is supported for translation in the fore-aft direction of the machine 10 via the top rail 164 and the bottom rail 166. To this end, the stroke plate 160 includes a first pair of pillow blocks 165a, 165b that receive the top rail 164 and are secured to the second surface 163 at the plate upper end, and a second pair of pillow blocks 167a, 167b that receive the bottom rail 166 and are secured to the second surface 163 at the plate lower end. Each pillow block 165a, 165b, 167a, 167b, defines a bore lined with lubrication-free polymer bearing surface. The top and bottom rails 164, 166 are secured to the frame 12 and extend in parallel with the longitudinal axis 111 (FIGS. 3 and 4) of the carriages 100a, 100b. In addition, a vertically-extending linear rail 169 protrudes outward from the stroke plate first surface 161, and the thrust block 272 of the second connection assembly 270 is slideably connected to the vertical rail 169, whereby a vertical adjustment, and pivoting movement, of the carriages 100a, 100b can be accommodated. Actuation of the second cam-and-linkage subassembly 162 by the motor 50 results in fore-aft reciprocation of the stroke plate 160 along the top and bottom rails 164, 166. In turn, the fore-aft reciprocation of the stroke plate 160 results in axial translation of the drive block 282, and thus also the hooked needle 210, relative to the moveable housing 102.

Referring again to FIG. 5, the cord guide assembly 300 includes the cord guide 302, a third connection assembly 330 that connects the cord guide 302 to a cord guide rotation (e.g., wag) actuator 380 (FIGS. 1D, 22) that is configured to rotate the cord guide 302 about its longitudinal axis 303, and a fourth connection assembly 360 that connects the cord guide 302 to a cord guide lift actuator 390 (FIGS. 1C, 1D, 22) that is configured to rotate the cord guide 302 about an axis 378 transverse to the cord guide longitudinal axis 303, resulting in a lifting of the cord guide 302 relative to the carriage moveable housing 102.

The cord guide 302 includes an elongate cord guide shaft 304 having a first end 306, and a second end 308 opposed to the first end 306. The cord guide longitudinal axis 303 extends between the cord guide shaft first and second ends 306, 308.

Figures 14, 15:
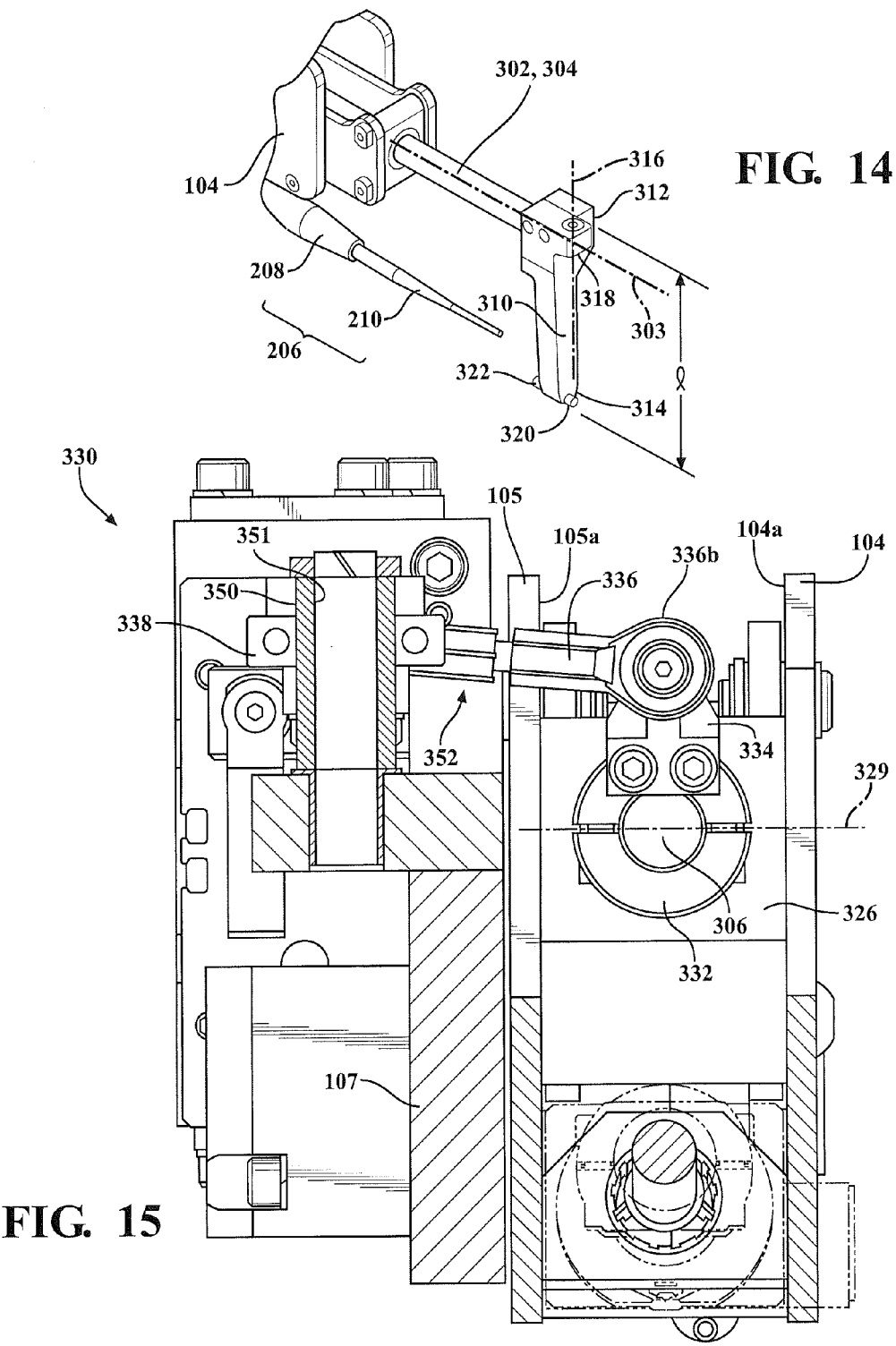
FIG. 14 is a front perspective view of the cord holder.
FIG. 15 is a cross sectional view of the third connection assembly as seen along line H-H of FIG. 2.

Referring to FIG. 14, the cord guide 302 also includes a cord holder 310 secured to the cord guide shaft second end 308. The cord holder 310 includes a first end 312, a second end 314 opposed to the first end 312, and a holder axis 316 that extends between the cord holder first end 312 and the cord holder second end 314. The cord holder first end 312 includes a first through bore 318 that extends transverse to the holder axis 316, and is sized and dimensioned to receive the cord guide shaft second end 308 therethrough. A set screw or other conventional fastening method is used to secure the cord holder 310 to the cord guide shaft second end 308. The cord holder second end 314 includes a second through bore 320 that extends transverse to the holder axis 316 and parallel to the first through bore 318. The second through bore 320 has a smaller cross-sectional dimension than the first through bore 318, and a guide pin 322 is secured within the second through bore 322. The guide pin 322 has sufficient length to protrude slightly from each end of the second through bore 322. The length l of the cord holder 310 (e.g., the distance between the cord holder first end 312 and the cord holder second end 314) is set to correspond to a vertical distance between the cord guide shaft second end 308 and the hooked needle 210.

Figure 16:
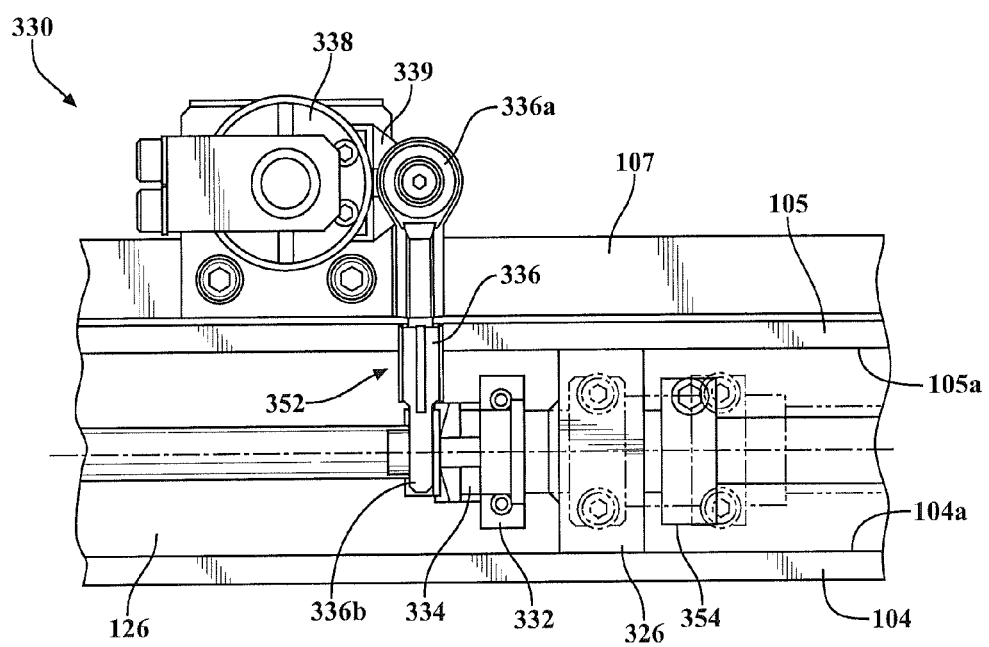
FIG. 16 is an enlargement of a portion of FIG. 4 showing a top view of the third connection assembly.
Figure 17:
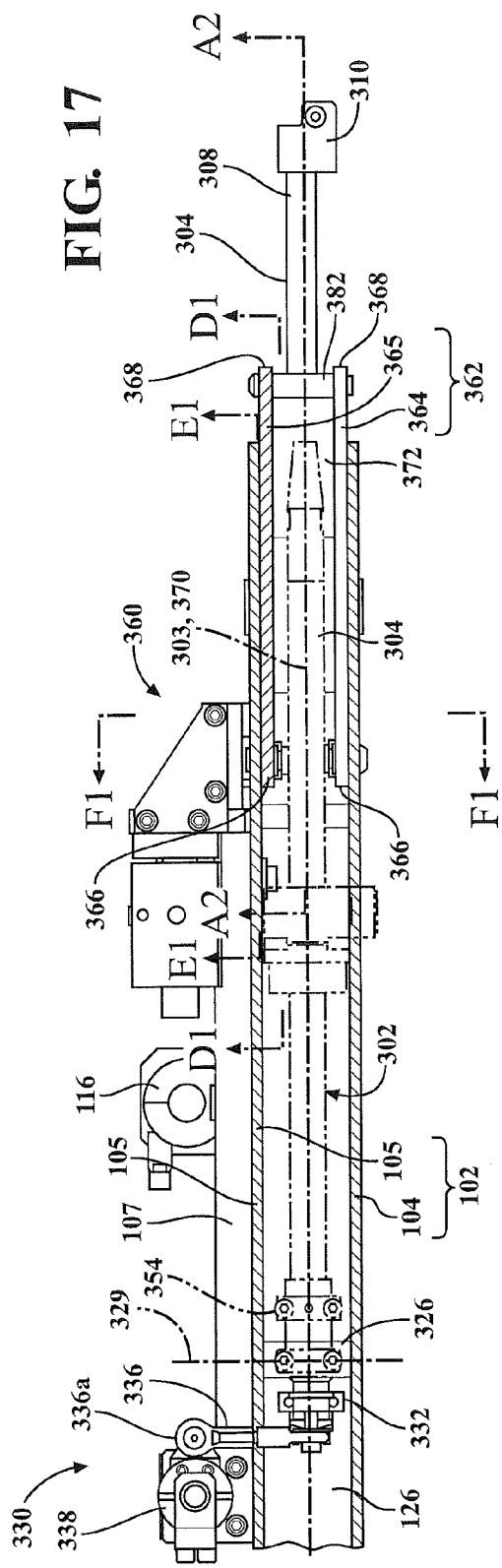
FIG. 17 is an enlargement of a portion of FIG. 4 showing a top view of the fourth connection assembly.
Figure 18:
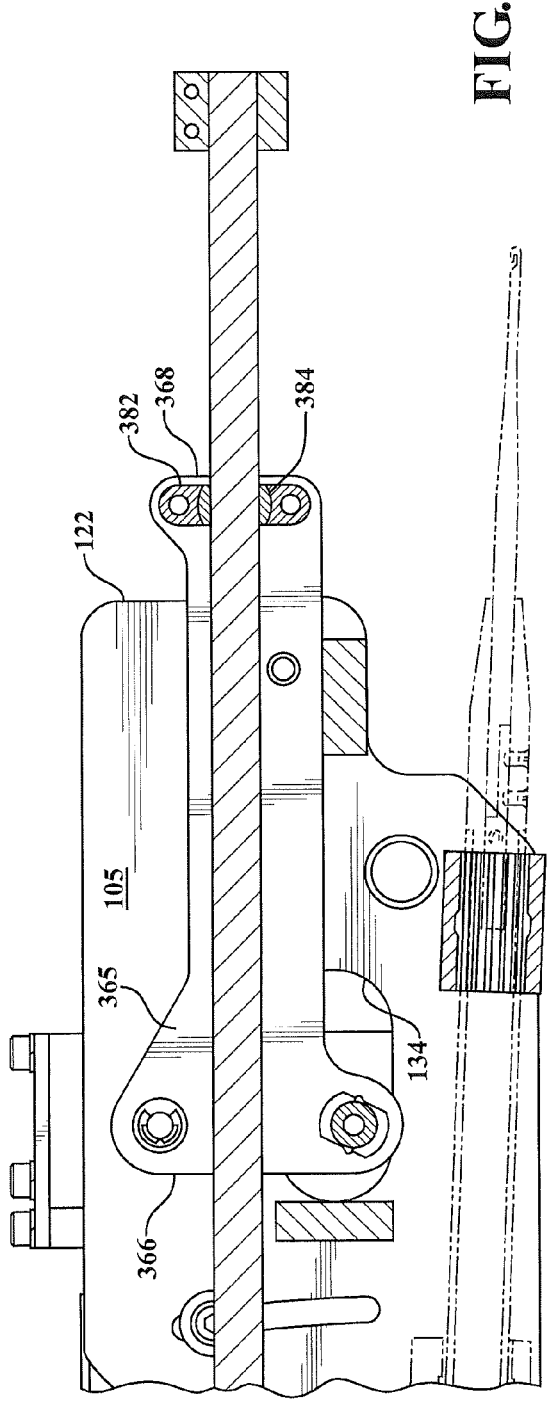
FIG. 18 is a cross sectional view of the fourth connection assembly as seen along line A2-A2 of FIG. 17.
Figure 19:
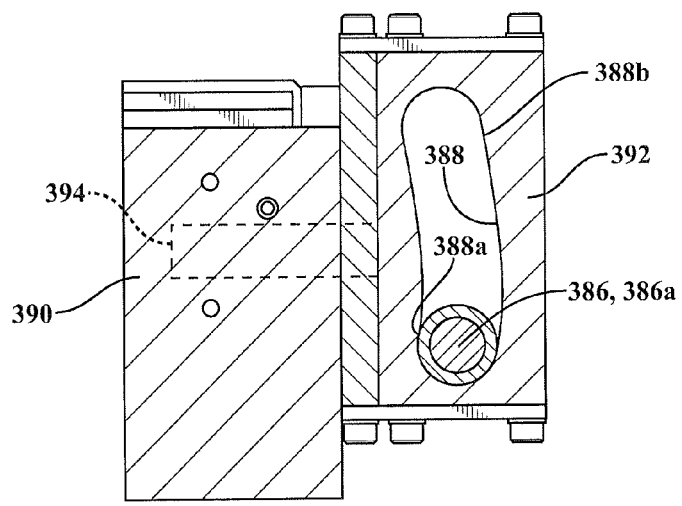
FIG. 19 is a cross sectional view of the fourth connection assembly as seen along line E1-E1 of FIG. 17.
Figure 20:
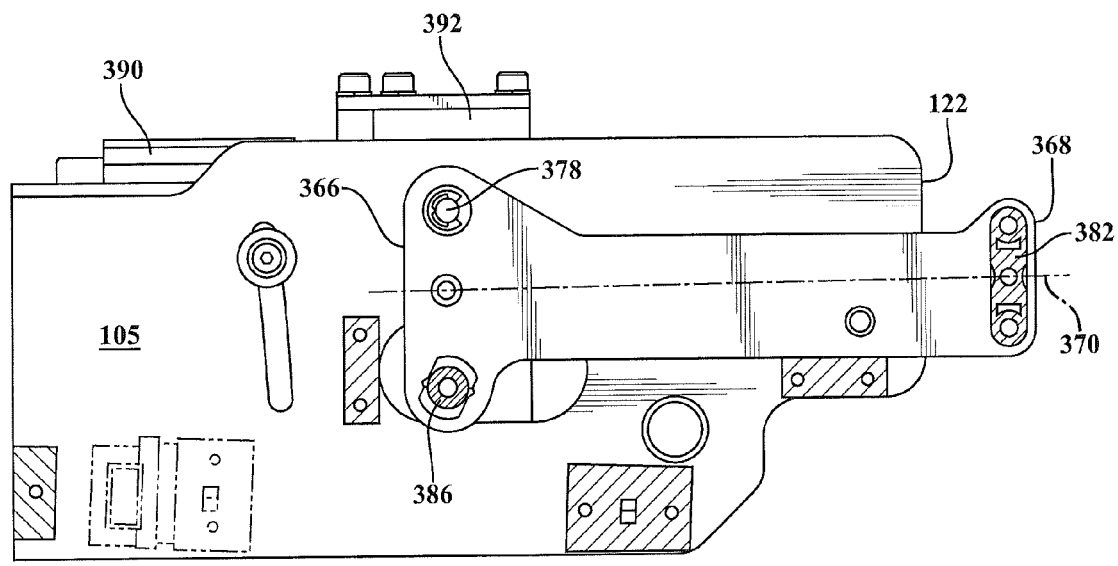
FIG. 20 is a cross sectional view of the fourth connection assembly as seen along line D1-D1 of FIG. 17.

Referring to FIGS. 10, 15 and 16, the third connection assembly 330 connects the cord guide shaft first end 306 to the cord guide rotation actuator 380 (FIGS. 1D, 22), whereby the cord guide 302 can be rotated about its longitudinal axis 303. The amount of rotation provided by the cord guide rotation actuator 380 is less than a full rotation, and the motion is oscillatory, whereby the cord holder 310 can perform a "wagging" motion that drapes the cord over the needle shaft hooked needle 210. The third connection assembly 330 includes a splined bushing 350 supported on the plate 107 of the stationary housing 106 so as to be rotatable about a vertical axis. The splined bushing 350 includes a splined inner surface 351 that engages with a splined outer surface of a drive shaft 344 (not shown in FIG. 15) of the cord guide rotation actuator 380. The splined bushing 350 is connected to the cord guide shaft first end 306 via a linkage 352 that includes a first collar 338 secured to an outer surface of the splined bushing 350, and a first arm 339 that connects the first collar 338 to one end 336a of a link 336 that includes opposed spherical rod ends 336a, 336b, the opposed ends 336a, 336b being oriented perpendicular to each other. The linkage 352 includes a second arm 334 that connects the other end 336b of the link 336 to a second collar 332. The second collar 332 secures the linkage 352 to the cord guide shaft first end 306.

The cord guide shaft first end 306 is rotatably supported on first end bearing housing 326 that houses a spherical, lubrication-free, polymer bearing surface 328. The first end bearing housing 326 is positioned adjacent to the second collar 332, and extends between opposed inner surfaces 104a, 105a of the moveable housing side plates 104, 105. The first end bearing housing 326 and its spherical bearing surface 328 permit the cord guide shaft 304 to rotate about its longitudinal axis 303, as well as rotate about a transverse axis 329 that is both transverse to the cord guide shaft longitudinal axis 303 and normal to the side plate inner surfaces 104a, 105a. The axial position of the cord guide shaft first end 306 within the first end bearing housing 326 is maintained by a third collar 354. The third collar 354 is connected to the cord guide shaft first end 306 and positioned adjacent the first end bearing housing 326 on a side of the first end bearing housing 326 that is opposed to the second collar 332.

Referring to again to FIGS. 1C and 1D, the cord guide rotation actuator 380 is connected to the cord guide shaft first end 306 via the third connection assembly 330. The third connection assembly 380 includes a third cam-and-linkage subassembly 172 disposed below the main platform 16 that connects the main motor 50 to the vertically-oriented drive shaft 170. As previously discussed, the third cam-and-linkage subassembly 172 is configured to produce an oscillatory motion of the shaft 170. The amount of rotation provided by the shaft 170 is less than a full rotation of the shaft 170, and the motion is oscillatory, whereby the cord holder 310 can perform a "wagging" motion that drapes the cord over the needle shaft hooked needle 210.

Referring to FIGS. 17-21, the fourth connection assembly 360 connects the cord guide shaft 304 to the cord guide lift actuator 390 (FIG. 19) that is configured to rotate the cord guide 302 about the transverse axis 329 relative to the moveable housing 102. The fourth connection assembly 360 includes a lift housing 362 pivotably secured to the moveable housing 102. The lift housing 362 includes a pair of elongate, parallel cord guide lift arms 364, 365. Each lift arm 364, 365 has a first end 366 that corresponds to a first end of the lift housing 362, and an opposed second end 368 that corresponds to a second end of the lift housing 362. A longitudinal axis 370 of the lift housing 362 extends between the first end 366 and the second end 368. The lift arms 364, 365 are spaced apart in a direction transverse to the longitudinal axis 370, defining an interior space 372 that receives a portion of the cord guide 302.

The cord guide shaft second end 308 is rotatably supported on second end bearing housing 382 that extends between, and is mounted to, opposed inner surfaces of the lift arms 364, 365. The second end bearing housing 382 houses a spherical, lubrication-free, polymer bearing surface 384 that supports the cord guide shaft 304 at a location between the cord guide shaft first and second ends 306, 308. The second end bearing housing 382 is positioned adjacent to a second end 368 of the lift housing 326. The cord guide shaft 304 is supported within the carriage 100 via the first end bearing housing 326 and the second end bearing housing 382 in a manner such that when the lift housing 362 is in an "at rest" position (e.g., is not being lifted by the lift actuator 390), the cord guide shaft longitudinal axis 303 is generally parallel to the moveable housing longitudinal axis 124 (shown in FIG. 5).

Figure 21:
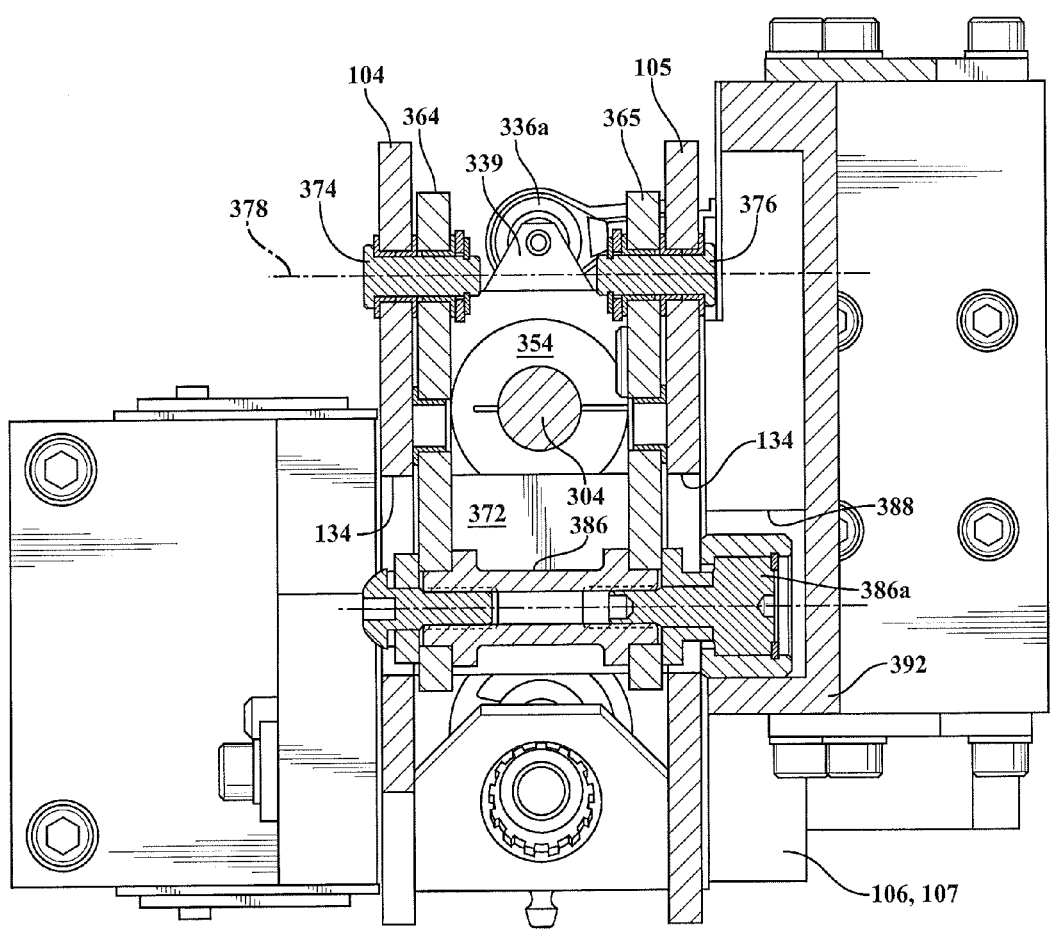
FIG. 21 is a cross sectional view of the fourth connection assembly as seen along line F1-F1 of FIG. 17.

The first end 366 of one of the cord guide lift arms, e.g., lift arm 364, is pivotably secured to one of the side plates 104 of the moveable housing 102 via a first pin 374, and the first end 366 of the other of the cord guide lift arms, e.g., lift arm 365, is pivotably secured to the other of the side plates 105 of the moveable housing 102 via a second pin 376 (FIG. 21). The first pin 374 and second pin 376 are coaxial, and together define a pivot axis 378 of the lift housing 362. The pivot axis 378 extends in a direction normal to the inner surfaces of the lift arms 364, 365, and is located above the cord guide shaft 304 when the lift housing 362 is in the "at rest" position.

The fourth connection assembly 360 also includes a cam follower shaft 386, and a cam track block 392 that is configured to receive an end 386a of the cam follower shaft 386. The cam follower shaft 386 is supported by, and extends through fitted through-openings in each of the lift arms 364, 365 so as to extend across the lift housing interior space 372 in a direction normal to the inner surfaces of the lift arms 364, 365. The cam follower shaft 386 protrudes outward from each outer surface of the lift arms 364, 365, and resides in corresponding cut outs 134 formed in the moveable housing side plates 104, 105. The one end 386a of the cam follower shaft 386 passes through the corresponding cut out 134 and is received within a cam profile 388 formed in a surface of the cam track block 392, which is positioned adjacent to moveable housing side plate 105 in the vicinity of the cut out 134.

The cam track block 392 is supported on the stationary housing 106 and is moveable relative to the stationary housing 106 along an axis parallel to the stationary housing longitudinal axis 111 (FIG. 4). In particular, the cam track block 392 is mounted on a drive shaft 394 of the cord guide lift actuator 390. The cord guide lift actuator drive shaft 394 is oriented in a direction parallel to the stationary housing longitudinal axis 111, and is configured to provide a reciprocating translation of the cam track block 392 along the stationary housing longitudinal axis 111. An axial movement of the cam track block 392 results in a rotation of the lift housing 362 about its pivot axis 378 due to tracking of the cam follower shaft 386 within the cam profile 388. In particular, the shape and orientation of the cam profile 388 determines the lift path of the lift housing 362. In the illustrated embodiment, the cam profile has a subtle "J" shape, including a slightly concave portion 388a at a lower end thereof, and a linear portion 388b extending upward from the concave portion 388a. The slightly-concave portion 388a provides an initial lift of about 5/8 inch, and the linear portion 388b is angled slightly toward the lift arm first end 366 relative to the vertical, whereby the lift housing 362 pivots about its pivot axis 378, causing the cord guide shaft 304 to pivot about the transverse axis 329 (FIGS. 3, 17), whereby the cord guide shaft second end 308 is lifted. Here, the term "lift" applies to movement of the upper carriage 100a. It is understood that the movement of the lower carriage 100b is a reflection of the movement of the upper carriage 100a, whereby the cord guide second end 308 of the lower carriage 100b is lowered as the cord guide second end 308 of the upper carriage 100a is lifted.

The position of the second end 368 of the lift housing 362 relative to the moveable housing 102 is determined by the cord guide lift actuator 390, which is configured to pivot the lift housing 362 relative to the moveable housing 102. As previously discussed, the carriage actuator 130 (FIGS. 1B, 1C, 22) is connected to the second end 122 of the moveable housing 102 and is operable to lift the moveable housing second end 122 relative to the moveable housing first end 120 (e.g. pivot the carriage 100 about the pivot axis 128). Thus, the position of the second end 368 of the lift housing 362 relative to the fixed housing 106 and the frame 12 is determined by cooperation of the cord guide lift actuator 390 and the carriage actuator 130. In addition, the vertical position of the needle shaft 202 relative to the stator coil support device 13 is determined by the position of the moveable housing second end 122, whereas the cord guide lift actuator provides additional vertical movement of the cord guide second end and cord holder 310 relative to the moveable housing second end 122.

Referring to FIG. 22, the stator coil lacing machine 10 may include a controller 400 that controls the main drive motor 50, the carriage actuator 130, the needle rotation actuator 280, the needle translation actuator 290, the cord guide rotation actuator 380, the compressed air source 45 for the cord guide lift actuator 390, and a stepper motor 40 that provides step-wise rotation of the stator 2 relative to the stator support device 13 in a synchronized, coordinated manner to achieve lacing of the stator windings. The cord guide lift actuator 390 is a double-acting pneumatic cylinder with the integrated guide shaft 394. In the illustrated embodiment, the carriage actuator 130, the needle rotation actuator 280, the needle translation actuator 290 and the cord guide rotation actuator 380 employ appropriate motor-driven cam-and-linkage actuator assemblies to achieve the desired actuation. However, it is understood that stepper and/or servo motors may be employed to provide one or more of the actuators 130, 280, 290, 380 rather than the motor-driven cam-and-linkage actuator assemblies. By doing so, the size, weight, complexity and cost of the stator coil lacing machine 10 are reduced. In addition, the corresponding lubrication systems typically required in motor-driven cam-and-linkage actuator assemblies may be omitted, further reducing size, weight, complexity and costs of the machine 10, and resulting in a machine that operates very cleanly.

In use, the movement of the cord through the cord holder 310 provides sufficient drag on the cord to retain its position in the hooked needle 210. With certain types of cord, this may not be true and a conventional tensioning device may be employed to provide a predetermined holding force on the cord.

In embodiment illustrated in FIGS. 1A-1D, the stator coil lacing machine 10 includes the stator support device 13 supported on the frame 12 adjacent to the carriage assemblies 100. The stator support device 13 includes a stationary platform 14 that supports a single stator 2. It is understood that in other embodiments, the stator support device 13 may be supported separately from the frame 12, and the frame 12 may include a sliding rail system 12b that would permit adjustment of the spacing between the stator support device 13 and the frame 12 in a fore-aft direction of the frame 12 (FIG. 24). In addition, the stator support device 13 may include a rotatable platform 70 that supports two or more stators support devices 13 simultaneously (FIG. 23), permitting an operator to load a second stator onto the platform 70 while a first stator is being laced. Alternatively, such a rotating platform arrangement would permit the stator to be rotated sequentially through multiple manufacturing stations, each station performing a separate manufacturing step (assembly, lacing, knotting, etc.) in the process of forming a stator 2.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. A stator coil lacing machine configured to lace a stator coil, the machine comprising:
   a frame;
   a carriage supported on the frame, the carriage including
      a housing pivotably supported on the carriage via a first pin;
      a needle assembly supported on the housing, the needle assembly including
         a needle shaft,
         a needle rotation actuator configured to rotate the needle shaft about a longitudinal axis of the needle shaft, and
         a needle translation actuator configured to move the needle shaft along the longitudinal axis of the needle shaft; and
      a cord guide assembly supported on the housing, the cord guide assembly including a cord guide shaft;
   a cord guide wag actuator connected to the cord guide shaft, the cord guide wag actuator configured to rotate the cord guide shaft about a longitudinal axis of the cord guide shaft;
   a cord guide lift actuator connected to the cord guide shaft, the cord guide lift actuator configured to rotate the cord guide shaft about an axis transverse to the longitudinal axis of the cord guide shaft; and
   a carriage actuator connected to the housing,
   wherein
      the carriage actuator is configured to move the housing relative to the carriage, and
      the carriage actuator, the needle rotation actuator, the needle translation actuator, the cord guide wag actuator, and the cord guide lift actuator are configured to be cooperatively actuated in a manner that results in lacing of the stator coil.

2. The stator coil lacing machine of claim 1, wherein the carriage is an upper carriage, and the stator coil lacing machine further comprises a lower carriage that is substantially identical to the upper carriage and is connected to the frame in an orientation that mirrors the orientation of the upper carriage.

3. The stator coil lacing machine of claim 2, wherein the lower carriage includes a lower carriage housing pivotably supported on the lower carriage via a second pin, and
   the carriage actuator is configured to rotate the upper carriage housing about the first pin and rotate the lower carriage housing about the second pin such that the upper carriage housing moves relative to the lower carriage housing in a scissoring motion.

4. The stator coil lacing machine of claim 1, further comprising a stator coil mount configured to support a stator coil in the vicinity of the needle assembly.

5. The stator coil lacing machine of claim 4, wherein the stator coil mount includes a rotatable platform that is configured to support at least two stator coils.

6. The stator coil lacing machine of claim 4, wherein the frame is configured to translate between a first position that is a first distance from the stator coil mount and a second position that is a second distance from the stator coil mount, where the first distance is different than the second distance.

7. The stator coil lacing machine of claim 1, wherein the needle shaft comprises
   a hollow mid portion including
      a first end,
      a second end opposed to the first end, and
      a longitudinal axis that extends between the first end and the second end,
   a hooked tip connected to the mid portion second end, and
   a splined shaft that is rotatable relative to the housing, the splined shaft engaging an inner surface of the mid portion in a manner that permits a rotation of the splined shaft to be transferred to the mid portion, and that permits the mid portion to telescope relative to the splined shaft.

8. The stator coil lacing machine of claim 7, wherein the needle rotation actuator is connected to the mid portion first end via the splined shaft.

9. The stator coil lacing machine of claim 7, wherein the needle assembly further comprises
   a thrust block fixed to the mid portion, the thrust block including
      a needle shaft bore that receives the mid portion therethrough, and
      a second pin that secures the mid portion to the thrust block,
   a drive block that includes a clearance bore that receives the mid portion therethrough, the drive block connected to an actuator that is configured to drive the mid portion along the longitudinal axis of the mid portion, and
   a safety release device disposed between the thrust block and the drive block,
   wherein the safety release device is configured to secure the drive block to the thrust block during normal operation of the needle assembly, and to release the drive block from the thrust block upon an abnormal operation of the needle assembly including impact of the tip with the stator coil.

10. The needle assembly of claim 9, wherein the safety release device is a magnet.

11. The needle assembly of claim 9, wherein a lubrication-free polymer bearing is disposed in the clearance bore between the drive block and the needle shaft.

12. The needle assembly of claim 9, wherein a flange bearing is disposed in the needle shaft bore between the thrust block and the needle shaft in a manner so that thrust applied to the thrust block is transferred to the second pin via a flange portion of the flange bearing.

* * * * *